United States Patent
Grant et al.

(10) Patent No.: US 10,748,391 B2
(45) Date of Patent: Aug. 18, 2020

(54) HAPTIC SIGNAL CONVERSION SYSTEM

(71) Applicant: Immersion Corporation, San Jose, CA (US)

(72) Inventors: Danny A. Grant, Laval (CA); Stephen D. Rank, San Jose, CA (US)

(73) Assignee: IMMERSION CORPORATION, San Jose, CA (US)

(*) Notice: Subject to any disclaimer, the term of this patent is extended or adjusted under 35 U.S.C. 154(b) by 0 days.

(21) Appl. No.: 16/233,881

(22) Filed: Dec. 27, 2018

(65) Prior Publication Data

US 2020/0211337 A1 Jul. 2, 2020

(51) Int. Cl.
| | | |
|---|---|---|
| G08B 6/00 | (2006.01) | |
| G08B 25/10 | (2006.01) | |
| H04R 3/00 | (2006.01) | |

(52) U.S. Cl.
CPC .............. G08B 6/00 (2013.01); G08B 25/10 (2013.01); H04R 3/00 (2013.01)

(58) Field of Classification Search
CPC ........ H04N 7/186; H04N 7/147; H04N 7/188; G08B 25/10; G08B 13/08; G08B 13/1436; G08B 13/19684; G08B 21/24; G08B 5/36; H04M 11/025; H04M 1/0291; H04M 1/7253; H02J 2007/0062; H02J 7/0052; H02J 1/00; H02J 4/00; F21Y 2115/10; G08C 17/02; H04L 2012/2841; H04L 51/36; H04L 51/38; H04L 63/08; H04L 67/1097; H04L 67/125; H04W 12/06; H04W 12/08; H04W 8/18
See application file for complete search history.

(56) References Cited

U.S. PATENT DOCUMENTS

| | | | | | |
|---|---|---|---|---|---|
| 4,238,778 A | * | 12/1980 | Ohsumi | ............... | G08G 1/0965 340/902 |
| 4,301,335 A | * | 11/1981 | Jucker | ................. | G01R 13/406 379/376.01 |
| 4,558,403 A | * | 12/1985 | Llerandi | ............. | H05B 39/044 315/323 |
| 4,691,313 A | * | 9/1987 | Iwata | ....................... | H04B 1/50 370/278 |
| 4,856,066 A | * | 8/1989 | Lemelson | ................. | G06F 3/16 704/275 |
| 5,428,388 A | * | 6/1995 | von Bauer | ............. | H04N 7/186 348/155 |
| 5,488,351 A | * | 1/1996 | Hedayatnia | .............. | G08B 6/00 310/311 |
| 5,550,893 A | * | 8/1996 | Heidari | .................... | H04B 1/40 375/216 |

(Continued)

OTHER PUBLICATIONS

Extended European Search Report in EP App. No. 19203662.2, dated Feb. 4, 2020.

*Primary Examiner* — Fekadeselassie Girma

(74) *Attorney, Agent, or Firm* — Nath, Goldberg & Meyer; Gregory B. Kang; Stanley N. Protigal

(57) ABSTRACT

A system is provided to process a source signal and generate one or more haptic effects for various haptic devices based on the source signal. The system operates to convert the source signal to meet different architectures of respective haptic devices and enables haptic effect designers to create haptic data without being concerned about low level details of different haptic devices.

17 Claims, 14 Drawing Sheets

(56) References Cited

U.S. PATENT DOCUMENTS

| | | | | |
|---|---|---|---|---|
| 5,657,418 A * | 8/1997 | Gerson | | G10L 19/12 |
| | | | | 704/207 |
| 5,774,039 A * | 6/1998 | Housley | | G08B 3/10 |
| | | | | 340/326 |
| 5,790,019 A * | 8/1998 | Edwin | | G08B 7/06 |
| | | | | 340/506 |
| 5,790,957 A * | 8/1998 | Heidari | | H04M 1/6505 |
| | | | | 455/553.1 |
| 6,108,584 A * | 8/2000 | Edwards | | H04S 1/007 |
| | | | | 381/22 |
| 7,583,191 B2 * | 9/2009 | Zinser | | G08B 13/196 |
| | | | | 340/539.1 |
| 7,738,917 B2 * | 6/2010 | Ryley | | G08B 3/10 |
| | | | | 340/539.25 |
| 7,746,223 B2 * | 6/2010 | Howarter | | G08B 3/10 |
| | | | | 340/13.31 |
| 8,139,098 B2 * | 3/2012 | Carter | | H04N 7/142 |
| | | | | 348/14.06 |
| 8,144,183 B2 * | 3/2012 | Carter | | H04N 7/142 |
| | | | | 348/14.06 |
| 8,193,919 B2 * | 6/2012 | Langer | | G08B 3/10 |
| | | | | 340/326 |
| 9,230,424 B1 * | 1/2016 | Scalisi | | G08B 27/005 |
| 9,740,381 B1 * | 8/2017 | Chaudhri | | G06F 3/0488 |
| 9,983,011 B2 * | 5/2018 | Mountain | | G01C 21/206 |
| 10,198,920 B1 * | 2/2019 | Yoneoka | | G08B 6/00 |
| 2002/0053969 A1 * | 5/2002 | Wagner | | G08B 5/36 |
| | | | | 340/286.08 |
| 2003/0031353 A1 * | 2/2003 | Baertsch | | A61B 6/00 |
| | | | | 382/132 |
| 2004/0172191 A1 * | 9/2004 | Vitikainen | | G01C 21/32 |
| | | | | 701/426 |
| 2004/0178889 A1 * | 9/2004 | Buckingham | | G06Q 10/02 |
| | | | | 340/328 |
| 2005/0134561 A1 | 6/2005 | Tierling et al. | | |
| 2008/0036862 A1 * | 2/2008 | Lang | | H04N 7/181 |
| | | | | 348/156 |
| 2008/0279318 A1 * | 11/2008 | Bharitkar | | H04R 3/04 |
| | | | | 375/350 |
| 2008/0303670 A1 * | 12/2008 | Seidel | | G08B 13/06 |
| | | | | 340/572.1 |
| 2009/0262757 A1 * | 10/2009 | Rainish | | H04L 1/0041 |
| | | | | 370/476 |
| 2010/0017000 A1 * | 1/2010 | Pulz | | G10L 13/10 |
| | | | | 700/94 |
| 2010/0195810 A1 * | 8/2010 | Mota | | H04N 7/186 |
| | | | | 379/167.12 |
| 2012/0044050 A1 * | 2/2012 | Vig | | G07C 9/37 |
| | | | | 340/5.82 |
| 2012/0162416 A1 * | 6/2012 | Su | | H04N 7/185 |
| | | | | 348/143 |
| 2012/0280790 A1 * | 11/2012 | Gerhardt | | G07C 9/00571 |
| | | | | 340/5.61 |
| 2013/0045763 A1 * | 2/2013 | Ruiz | | H04M 1/0291 |
| | | | | 455/466 |
| 2013/0057695 A1 * | 3/2013 | Huisking | | H04N 7/186 |
| | | | | 348/156 |
| 2013/0261811 A1 * | 10/2013 | Yagi | | G06F 3/03547 |
| | | | | 700/280 |
| 2014/0062682 A1 * | 3/2014 | Birnbaum | | G08B 6/00 |
| | | | | 340/407.2 |
| 2014/0266669 A1 * | 9/2014 | Fadell | | G08B 27/003 |
| | | | | 340/501 |
| 2014/0340209 A1 * | 11/2014 | Lacroix | | G06F 3/165 |
| | | | | 340/407.2 |
| 2016/0284170 A1 * | 9/2016 | Kasmir | | H04L 12/2818 |
| 2017/0239562 A1 * | 8/2017 | Yang | | A63F 13/285 |
| 2017/0285747 A1 * | 10/2017 | Chen | | G08B 6/00 |
| 2017/0285750 A1 | 10/2017 | Cruz-Hernandez et al. | | |
| 2018/0084284 A1 * | 3/2018 | Rosewarne | | H04N 19/119 |
| 2018/0170229 A1 * | 6/2018 | Hashimoto | | B60N 2/90 |
| 2018/0253948 A1 | 9/2018 | Birnbaum et al. | | |
| 2018/0255411 A1 * | 9/2018 | Lin | | H04R 29/00 |
| 2018/0301140 A1 | 10/2018 | Turcott et al. | | |
| 2019/0103004 A1 * | 4/2019 | Rank | | G06F 3/016 |
| 2019/0197841 A1 * | 6/2019 | Carter | | G10K 15/04 |
| 2019/0265792 A1 * | 8/2019 | Wu | | G02B 27/0172 |
| 2020/0076866 A1 * | 3/2020 | Wu | | H04L 65/607 |

* cited by examiner

HAPTIC SIGNAL CONVERSION SYSTEM

BACKGROUND

Haptics is a tactile and force feedback technology that takes advantage of a user's senses by haptic effects such as vibrations, motions, and other forces and stimulations. Devices, such as mobile devices, gaming devices, touchscreen devices, and personal computers, can be configured to generate haptic effects. Haptic feedback can provide kinesthetic feedback (such as active and resistive force feedback) and/or tactile feedback (e.g., vibration, vibrotactile feedback, texture, heat, etc.) to a user. Haptic effects may be useful to alert the user to specific events or to provide realistic feedback to create greater sensory immersion within a simulated or virtual environment.

A haptic effect developer can author a haptic effect for different devices. Where such devices have different architectures, a single haptic signal is not typically compatible for all the devices, and different haptic signals may need to be designed to be specific to respective devices. Therefore, it is desired to allow a haptic effect designer to create a wide range of haptic effects without being concerned with specific architectures of different devices.

SUMMARY

The embodiments of the present invention are generally directed toward techniques for haptic signal conversion.

In the example embodiments, methods, apparatuses, and instructions for generating a haptic effect using a haptic output device are provided. A signal is received from an external source, the signal being generic or unconfigured for the haptic output device. The signal is processed to create a signal buffer. A haptic signal compatible with the haptic output device is generated based on the signal buffer. The haptic signal is applied to the haptic output device, thereby providing the haptic effect. In some configurations, and by non-limiting example, the haptic signal conversion includes transcoding a signal to generate one or more haptic effects for devices with different haptic architectures.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DETAILED DESCRIPTION

Figure 1:
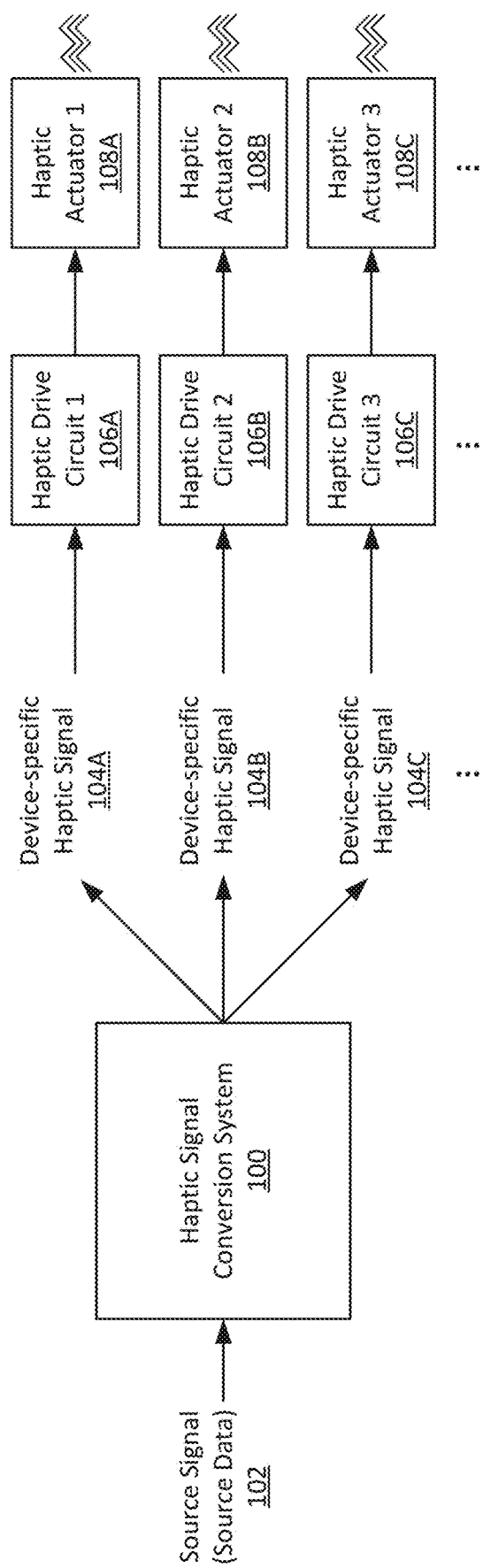
FIG. 1 illustrates a haptic signal conversion system according to an example embodiment of the present disclosure.

Various embodiments are described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, a system is provided to automatically generate one or more haptic effects based on a source signal. In the various embodiments, a signal is used to represent data associated with, or conveyed by, the signal. In some embodiments, the source signal is not directly used for a device that generates a haptic effect. In other embodiments, the source signal is generic or unconfigured for different haptic devices having different architectures. The source signal may be of various types of signals, such as an audio signal, a video signal, or other non-haptic signals. In other embodiments, the source signal is an arbitrary signal. In yet other embodiments, the source signal may be a haptic signal (or haptic data) that is created by a haptic effect designer. As described herein, the embodiments of the present disclosure provides solutions to convert such a haptic signal to meet different architectures of respective haptic devices. Additionally, the embodiments described herein enable haptic effect designers to create haptic data without being concerned about low level details of different haptic devices.

FIG. 1 illustrates a haptic signal conversion system 100 in accordance with according to an example embodiment of the present disclosure.

The haptic signal conversion system 100 operates to receive a source signal 102, which represents source data, and automatically converts the received source data into haptic information. The haptic information from haptic signal conversion system 100 may include haptic signals 104 (including 104A, 104B, and 104C) that are specific to different haptic devices. Haptic signals 104 that are device-specific are configured to be usable by different haptic actuator drive circuits 106 (including 106A, 106B, and 106C).

Actuator drive circuit 106 is a circuit that receives a haptic signal 104 (which is also referred to herein as a control signal) from haptic signal conversion system 100. Haptic signal 104 includes haptic data associated with one or more haptic effects, and the haptic data defines one or more parameters that actuator drive circuit 106 uses to generate an actuator drive signal. In example embodiments, such parameters relate to, or are associated with, electrical characteristics. Examples of electrical characteristics that may be defined by the haptic data include frequency, amplitude, phase, inversion, duration, waveform, attack time, rise time, fade time, and lag or lead time relative to an event. Actuator drive signal 106 is applied to a haptic actuator 108 (including 108A, 108B, and 108C) to cause one or more haptic effects.

Haptic actuator 108, which also is referred to herein as an actuator or a haptic output device, operates to generate haptic effects. Based on the received haptic signal 105, actuator drive circuit 106 generates and applies an actuator drive signal to actuator 108 to drive the actuator 108. When applied to actuator 108, an actuator drive signal causes actuator 108 to generate haptic effects by activating and braking actuator 108.

Actuator 108 may be of various types. In the illustrated embodiments, the actuator is a resonant actuator, such as a Linear Resonant Actuator (LRA) in which a mass attached to a spring is driven back and forth. Although a resonant actuator is described as an example actuator, the embodiments are not so limited, and the embodiments may be readily applied to a variety of haptic output devices, such as those described herein.

Other types of electromagnetic actuators are also used, such as an Eccentric Rotating Mass (ERM) in which an eccentric mass is moved by a motor or a "smart material" such as piezoelectric, electro-active polymers or shape memory alloys. Actuators 108 also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

In some embodiments, source signal 102 is not formatted to be usable for a particular haptic device. In other embodiments, source signal 102 is generic or unconfigured for different haptic devices having different architectures. Additionally, or alternatively, source signal 102 may be provided from an external source. The source signal may be of various types of signals, such as an audio signal, a video signal, sensed signals, or other non-haptic signals. In other embodiments, the source signal may be an arbitrary signal. In yet other embodiments, the source signal may be a haptic signal (or haptic data) that is created by a haptic effect designer. As described herein, haptic signal conversion system 100 may provide solutions to convert the designer-created haptic signal to meet different architectures of respective haptic devices. Therefore, system 100 may enable the haptic effect designer to create haptic data without being concerned about different capabilities and/or requirements of respective haptic devices.

In some embodiments, source data 102 may include data, such as audio data, video data, acceleration data, or another type of data that may be captured with a sensor. Haptic signal conversion system 100 may operate to analyze source data 102 and identify one or more haptic effects associated with source data 102. System 100 may output haptic signals 104 for the identified haptic effects. In some embodiments, source data 102 is stored in memory, where source data 102 is retrieved before the source data 102 is automatically converted into haptic information. Alternatively, source data 102 may be streamed before source data 102 is automatically converted into haptic information.

By way of example, embodiments herein relate to converting an arbitrary signal (i.e., source signal 102) to a specific commercial architecture, such as to generate a haptic effect signal. For example, haptic effects are generally performed during runtime in a game (also referred to as a game program or game application) that supports different types of game controllers, such as an Oculus® Touch game controller, and HTC Vive® game controller, or an Immersion® TouchSense Force (TSF) Gamepad. These players are capable of generating a haptic signal, for example, of 320 Hz or 160 Hz. When a signal with a different frequency is needed, the players cannot output that frequency.

Embodiments herein also support different types of game controllers (or, more generally, different types of user input device) by identifying the type of game controller that is currently providing input to the game, and retrieving haptic tracks that are associated with the identified type of game controller, and by retrieving game-controller-specific values for a haptic effect. For example, the player may generate a haptic signal according to the capabilities of the commercially implemented player architecture/commercially available game controller.

In some embodiments, values of haptic signals are game-controller-specific or game-controller-type-specific, rather than merely haptic-actuator-specific or haptic-actuator-type-specific, because even if two type of game controllers have the same type(s) of haptic actuators, the type of game controllers themselves may still have different masses, geometries, actuator placement, and other factors that affect the generating of a haptic effect. Thus, generating a converted signal may depend on the type of game controller, in combination or instead of the type of haptic actuator being used to generate a haptic effect. In some instances, generating a converted signal may depend on the software/firmware that is beyond the control of this haptic conversion system. For example, an input signal may be converted into function calls of a 3rd-party application programming interface (API) such that the 3rd-party API may generate a haptic signal. This functionality may be provided as a part of the haptic conversion system, or as a separate component such that the haptic conversion system converts from the input signal to a signal or instruction comprised of a series of API calls that supply data to the 3rd-party API.

Figure 2:
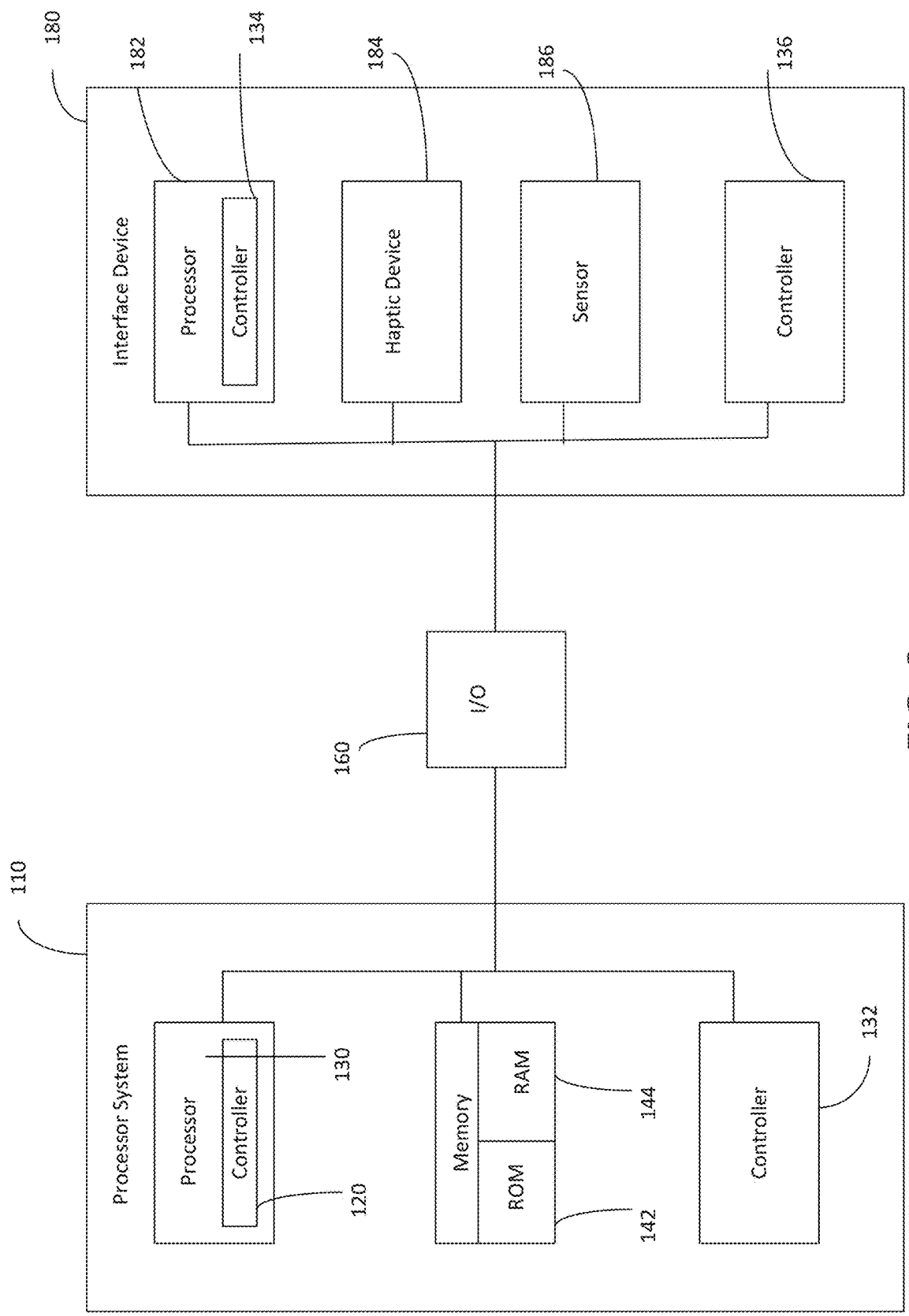
FIG. 2 is a block diagram of a system having a processor system and an interface device according to an example embodiment of the present disclosure.

FIG. 2 is a block diagram of a system having a processor system 110 and an interface device 180 according to an example embodiment of the present disclosure.

The system illustrated in FIG. 2 includes a processor system 110 in communication with an interface device 180. Processor system 110 may be, for example, a commercially available personal computer or a less complex computing or processing device that is dedicated to performing one or more specific tasks. For example, processor system 110 may be a terminal dedicated to providing an interactive virtual reality environment, such as a gaming system, or the like.

Processor system 110 includes a processor 120, which according to one or more embodiments of the present disclosure may be a commercially available microprocessor. Alternatively, processor 120 may be an application-specific integrated circuit (ASIC) or a combination of ASICs, which is designed to achieve one or more specific functions, or enable one or more specific devices or applications. In yet another alternative, the processor 120 may be an analog or digital circuit, or a combination of multiple circuits.

Alternatively, or additionally, processor 120 may optionally include one or more individual sub-processors or coprocessors. For example, the processor may include a graphics coprocessor that is capable of rendering graphics, a controller that is capable of controlling one or more devices, a sensor that is capable of receiving sensory input from one or more sensing devices, and so forth.

Processor system 110 also includes a memory component 140. As shown in FIG. 2, memory component 140 may include one or more types of memory. For example, memory component 140 may include a read only memory (ROM) component 142 and a random access memory (RAM) component 144. The memory component 140 also may include other types of memory not illustrated in FIG. 2 that are suitable for storing data in a form retrievable by the processor 120. For example, electronically programmable read only memory (EPROM), erasable electrically programmable read only memory (EEPROM), flash memory, as well as other suitable forms of memory may be included within the memory component 140. Processor system 110 also may include a variety of other components, depending upon the functionality of processor system 110.

Processor 120 is in communication with the memory component 140, and may store data in memory component 140 or retrieve data previously stored in memory component 140. The components of processor system 110 may communicate with devices external to processor system 110 by way of an input/output (I/O) component 160. According to one or more embodiments of the present disclosure, I/O component 160 may include a variety of suitable communication interfaces. For example, I/O component 160 may include, for example, wired connections, such as serial ports, parallel ports, universal serial bus (USB) ports, S-video ports, large area network (LAN) ports, small computer system interface (SCSI) ports, audio ports, and so forth. Additionally, the I/O component 160 may include, for example, wireless connections, such as infrared ports, optical ports, Bluetooth wireless ports, wireless LAN ports, or the like.

By way of I/O component 160, processor system 110 may communicate with other devices, such as interface devices 180. These interface devices 180 may be configured to provide haptic feedback. Each interface device 180 may communicate with the processor system 110 by way of an I/O component 160, which is similar to I/O component 160 of processor system 110 and may include any of the wired or wireless communications ports described above in connection with that I/O component 160. Thus, the communications link between I/O component 160 of processor system 110 and I/O component 160 of interface device 180 may take a variety of forms, including, for example, wired communications links, wireless communications links (e.g., RF links), optical communications links, or other suitable links.

Interface device 180 includes a number of components, such as a processor 182, a haptic device 184, and a sensor 186. As with the components of processor system 110, interface device 180 may include additional components. For example, the interface device may include additional duplicates of the components shown in FIG. 2 (e.g., the interface device 180 may include multiple processors 182, haptic devices 184, sensors 186 and/or controllers 136, etc.). Additionally, interface device 180 may include other components not shown in the figure. For example, where it is desirable to store data received by interface device 180 via I/O component 160, a suitable memory component or buffer memory component may be used.

Processor 182 of interface device 180, may be similar to processor 120 of processor system 110, described above, or may be specifically designed (e.g., an ASIC) and/or programmed for the functionality of the interface device 180. As with processor 120 of processor system 110, processor 182 of interface device 180, may include a variety of sub-processors, which may, for example, be used in parallel.

As discussed above, interface device 180 includes a haptic device 184, which is used to provide tactile or haptic feedback to a user of interface device 180. In some embodiments, haptic device 184 includes one or more actuators, such as actuator 108 as illustrated in FIG. 1. According to an embodiment of the present disclosure, haptic feedback may be provided by way of a physical object, such as a housing, a manipulandum, or the like. Haptic device 184 may take a variety of forms, including one or more haptic devices that each includes multiple operational modes associated with multiple corresponding frequency ranges. Some examples of haptic device 184 configurations that may be used in accordance with one or more embodiments of the present disclosure are described in greater detail below. The examples of haptic devices 184 given below, however, are not intended to form an exhaustive list of all types of haptic devices 184 that may be included in the interface device 180 but are intended instead as examples only.

Sensor 186 of interface device 180 is configured to sense input from a user of interface device 180. For example, sensor 186 may be used to sense manipulation or movement of a physical object, such as a manipulandum, of interface device 180. Sensor 186 also may be used to sense other forms of user input, such as pressure, speed, acceleration, torque, light, or other measurable quantities. For example, sensor 186 may incorporate a piezoelectric sensor to sense pressure, an inertial measurement unit (IMU), such as an accelerometer, to sense various forms of motion, a photovoltaic sensor to sense changes in light levels, and/or other sensors. Sensor 186 also may sense other input, such as feedback (e.g., state information including position and/or velocity) from the haptic device 184, for example.

As shown in FIG. 2, the various components of interface device 180 are in communication with one another and with the components of processor system 110 (via the I/O component 160). Processor 182 of the interface device 180, for example, may be used to control haptic device 184 based on information received from sensor 186. Similarly, processor 120 of processor system 110 may be used to control haptic device 184 of interface device 180 based on information received from sensor 186 of interface device 180; in such an embodiment, the processor 182 is optional and need not be present. Alternatively, processor 120 of processor system 110 (also referred to as a "host processor") may be used in concert with processor 182 of interface device 180 (also referred to as a "local processor") to interpret data received from sensor 186 and/or to control haptic device 184.

Processor system 110 and interface device 180 may optionally make use of one or more controllers 130, 132, 134, 136 (which is referred to hereinafter as a controller 130, collectively, individually, or as a subset). As shown in FIG. 2, a controller 130 may be configured as part of processor 120 (e.g., in the form of a control algorithm) of processor system 110 and/or processor 182 of interface device 180. Additionally, a controller 130 may be a separate component connected to the other components of the processor system 110 and/or the interface device 180 via a bus or other suitable connection. It should be recognized that, according to the various embodiments, interface device 180 may function independently of processor system 110, as it has its own processor and/or controller 134, 136, and may not utilize processor system 110 at all. For example, interface device 180 may be a stand-alone device such as a personal digital assistant (PDA) or a cellular telephone, which may or may not be configured to connect to a processor system 110.

Game controller 136 may be an Oculus® Touch controller, an HTC Vive® controller, an Immersion® TSF gamepad, or other similar controller. Each type of game controller may have different number and/or types of haptic actuators. In one example, game controller 136 may have haptic actuators, one of which may be a kinesthetic actuator (e.g., motor) that pushes and pulls on a trigger of the game controller 136, while the other may be a rumble actuator, such as an eccentric rotation mass (ERM) actuator used to generate a rumble or other form of vibration. In this example, game controllers may each have a haptic actuator that is, e.g., a linear resonant actuator (LRA). Further, a game controller may have multiple (e.g., four) actuators, each of the multiple actuators may be a kinesthetic actuator, ERM actuator, LRA, electrostatic actuators, or any other type of haptic actuator.

In an embodiment, a game or haptic designer may design a variety of different haptic tracks for a particular haptic effect. Additionally, or alternatively, the game or haptic designer may generate haptic tracks according to the capabilities of device to be used, such as a particular game controller or type of game controller. Here, the game or haptic designer may generate a source signal for each respective device according to its functional capabilities. The source signal may then be converted into a form suitable for the target device, including transcoding, data conversion, pulse-train insertion, 3rd-party API calls, etc. to produce the haptic signal. Each game controller, or each type of game controller, may be referred to or represented in the game program as an endpoint. For instance, a haptic effect may occur when a user fires a weapon, or when a user incurs damage. The game or haptic designer may have designed and stored, for each haptic effect, a respective haptic track for each type of game controller that is supported by the game.

Non-transitory memory may include a variety of computer-readable media that may be accessed by a processor. In the various embodiments, memory and other memory devices described herein may include a volatile and non-volatile medium, removable and non-removable medium. For example, memory may include any combination or random access memory ("RAM"), dynamic RAM ("DRAM"), static RAM ("SRAM"), read only memory ("ROM"), flash memory, cache memory, and/or any other type of non-transitory computer-readable medium. Memory stores instructions executed by a processor. Among the instructions, memory includes instructions for haptic effect design module. Haptic effect design module includes instructions that, when executed by processor enables a haptic editing application and further renders the haptic effects using actuators, as disclosed in more detail below. Memory may also be located internal to processor, or any combination of internal and external memory.

The actuator may be any type of actuator or haptic output device that may generate a haptic effect. In general, an actuator is an example of a haptic output device, where a haptic output device is a device configured to output haptic effects, such as vibrotactile haptic effects, electrostatic friction haptic effects, temperature variation, and/or deformation haptic effects, in response to a drive signal. Although the term actuator may be used throughout the detailed description, the embodiments of the present disclosure may be readily applied to a variety of haptic output devices. Actuator may be, for example, an electric motor, an electromagnetic actuator, a voice coil, a shape memory alloy, an electro-active polymer, a solenoid, an eccentric rotating mass motor ("ERM"), a harmonic ERM motor ("HERM"), a linear resonance actuator ("LRA"), a solenoid resonance actuator ("SRA"), a piezoelectric actuator, a macro fiber composite ("MFC") actuator, a high bandwidth actuator, an electroactive polymer ("EAP") actuator, an electrostatic friction display, an ultrasonic vibration generator, or the like. In some instances, the actuator itself may include a haptic drive circuit.

In general, an actuator may be characterized as a standard definition ("SD") actuator that generates vibratory haptic effects at a single frequency. Examples of an SD actuator include ERM and LRA. By contrast to an SD actuator, high definition ("HD") actuator or high fidelity actuator such as a piezoelectric actuator or an EAP actuator is capable of generating high bandwidth/definition haptic effects at multiple frequencies. HD actuators are characterized by their ability to produce wide bandwidth tactile effects with variable amplitude and with a fast response to transient drive signals. Although embodiments of the present disclosure were prompted by higher quality actuators, such as bidirectional actuators that provide push/pull effects (e.g., on an ActiveFORCE game controller trigger element) or frequency modifiable actuators, the embodiments are not so limited and may be readily applied to any haptic output device.

In embodiments that transmit and/or receive data from remote sources, the system further includes a communication device, such as a network interface card, to provide mobile wireless network communication, such as infrared, radio, Wi-Fi, cellular network communication, etc. In other embodiments, communication device provides a wired network connection, such as an Ethernet connection, a modem, etc.

Figure 3:
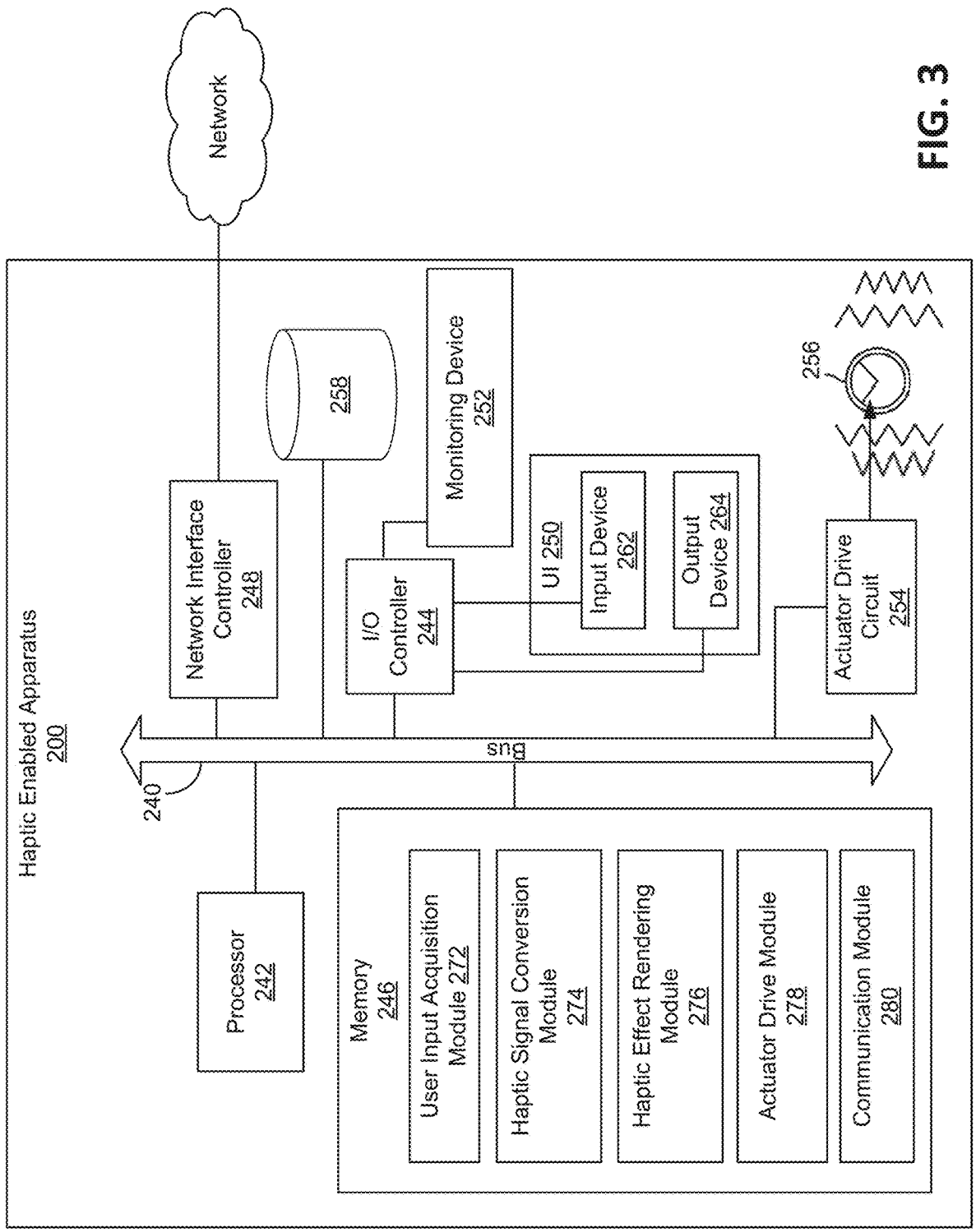
FIG. 3 illustrates a block diagram of a haptic-enabled apparatus according to an example embodiment of the present disclosure.

FIG. 3 illustrates a block diagram of a haptic enabled apparatus 200 according to an example embodiment of the present disclosure.

In various configurations, the haptic enabled apparatus 200 may implement at least part of the interface device 180 as illustrated in FIG. 2. The haptic enabled apparatus 200 may be any type of device that may be used to deliver haptic effects, such as a cellular phone, a smart phone, a personal digital assistant (PDA), a portable music player, a portable video player, a game system, a virtual reality (VR) system, a virtual reality headset, a 360-degree video headset, an automotive system, a navigation system, a desktop, a laptop computer, electronic appliances (e.g., a television, an oven, a washer, a dryer, a refrigerator, or a lighting system), a movie theater such as IMAX™ theater with seats, headsets, or other devices having haptic actuators, and any other electronic or computing devices capable of processing information as well as providing haptic feedback.

In some embodiments, haptic enabled apparatus 200 may be a single device. In other embodiments, haptic enabled apparatus 200 may collectively be a set of devices connected together.

In this example embodiment, haptic enabled apparatus 200 includes a bus 240, a processor 242, an input/output (I/O) controller 244, memory 246, a network interface controller (NIC) 248, a user interface 250, a monitoring device 252, an actuator drive circuit 254, a haptic actuator 256, and database 258.

In some embodiments, the elements, devices, and components of apparatus 200, as illustrated in FIG. 3, are incorporated into a single device, which may be worn or carried by a user. In other embodiments, at least one of the illustrated elements, devices, and components is separately arranged from the others and connected to each other either wirelessly or by wire.

Bus 240 includes conductors or transmission lines for providing a path to transfer data between the components in apparatus 200 including processor 242, I/O controller 244, memory 246, NIC 248, monitoring device 252, and actuator drive circuit 254. Bus 240 typically includes a control bus, address bus, and data bus. However, bus 240 may be any bus or combination of busses, suitable to transfer data between components in apparatus 200.

Processor 242 may be any circuit configured to process information and may include any suitable analog or digital circuit. Processor 242 also may include a programmable circuit that executes instructions. Examples of programmable circuits include microprocessors, microcontrollers, application specific integrated circuits (ASIC), programmable gate arrays (PLA), field programmable gate arrays (FPGA), or any other processor or hardware suitable for executing instructions. In various embodiments, processor 242 may be a single unit or a combination of two or more units. If processor 242 includes two or more units, the units may be physically located in a single controller or in separate devices.

Processor 242 may be the same processor that operates the entirety of apparatus 200, or may be a separate processor. Processor 242 may determine which haptic effects are to be played and the order in which the effects are played based on one or more parameters. For example, parameters that define a particular haptic effect include magnitude, frequency and duration. Other parameters such as streaming motor commands also may be used to determine a particular haptic effect.

Processor 242 receives signals or data from input device 262 and outputs control signals to drive actuator drive circuit 254. Data received by processor 242 may be any type of parameters, instructions, flags, or other information that is processed by the processors, program modules, and other hardware disclosed herein.

I/O controller 244 is circuitry that monitors operation of apparatus 200 and peripheral or external devices such as user interface 250. I/O controller 244 also manages data flow between apparatus 200 and the peripheral devices and relieves processor 242 from computations associated with monitoring and controlling the peripheral devices. Examples of other peripheral or external devices with which I/O controller 244 may interface includes external storage devices, monitors, input devices such as controllers, keyboards and pointing devices, external computing devices, antennas, other articles worn by a person, and any other remote devices.

Memory 246 may be any type of storage device or non-transitory computer-readable medium such as random access memory (RAM), read only memory (ROM), electrically erasable programmable read only memory (EEPROM), flash memory, magnetic memory, optical memory, or any other suitable memory technology. Memory 246 also may include a combination of volatile and nonvolatile memory. Memory 246 stores instructions executed by processor 242. Memory 246 also may be located internal to processor 242, or any combination of internal and external memory.

Network interface controller (NIC) 248 is in electrical communication with a network to provide communication (either wireless or wired) between apparatus 200 and remote devices. Communication may be according to any wireless transmission techniques including standards such as Bluetooth, cellular standards (e.g., CDMA, GPRS, GSM, 2.5G, 3G, 3.5G, 4G), WiGig, IEEE 802.11a/b/g/n/ac, IEEE 802.16 (e.g., WiMax). NIC 248 also may provide wired communication between apparatus 200 and the remote devices through wired connections using any suitable port and connector for transmitting data and according to any suitable communication standard such as RS 232, USB, FireWire, Ethernet, MIDI, eSATA, or thunderbolt.

User interface 250 may include an input device 262 and an output device 264. Input device 262 includes any device or mechanism through which a user may input parameters, commands, and other information into apparatus 200. In at least some embodiments, input device 262 is configured to monitor or detect one or more events associated with haptic enabled apparatus 200 or a user of haptic enabled apparatus 200, or one or more events performed by the user, of which the user may be informed with a haptic feedback. Input device 262 is any device that inputs a signal into processor 242.

Examples of input device 262 include touchscreens, touch sensitive surfaces, cameras, mechanical inputs such as buttons and switches, and other types of input components, such as a mouse, touchpad, mini-joystick, scroll wheel, trackball, game pads or game controllers. Other examples of input device 262 include a control device such as a key, button, switch or other type of user interfaces. Yet other examples of input device 262 include a transducer that inputs a signal into processor 242. Examples of transducers that may be used as input device 262 include one or more antennas and sensors. For example, input device 262 includes monitoring device 252 as described herein. In other examples, monitoring device 252 includes input device 262. Yet other examples of input device 262 include removable memory readers for portable memory, such as flash memory, magnetic memory, optical memory, or any other suitable memory technology.

Output device 264 includes any device or mechanism that presents information to a user in various formats, such as visual and audible formats. Examples of output device 264 include display screens, speakers, lights, and other types of output components. Output device 264 also may include removable memory readers. In an embodiment, the input device 262 and output device 264 are integrally formed, such as a touch-sensitive display screen.

With reference still to FIG. 3, monitoring device 252 operates to monitor parameters of apparatus 200 and/or a dynamic system including apparatus 200.

Monitoring device 252 includes one or more sensors of various types, which may be incorporated in apparatus 200 or connected to apparatus 200. In some embodiments, monitoring device 252 may include input device 262 of apparatus 200. Monitoring device 252 also may be referred to as an input device. Sensors may be any instruments or other devices that output signals in response to receiving stimuli. The sensors may be hardwired to the processor or may be connected to the processor wirelessly. The sensors may be used to detect or sense a variety of different conditions, events, environmental conditions, the operation or condition of the apparatus 200, the presence of other people or objects, or any other condition or thing capable of stimulating sensors.

Examples of sensors include acoustical or sound sensors such as microphones; vibration sensors; chemical and particle sensors such as breathalyzers, carbon monoxide and carbon dioxide sensors, and Geiger counters; electrical and magnetic sensors such as voltage detectors or hall-effect sensors; flow sensors; navigational sensors or instruments such as GPS receivers, altimeters, gyroscopes, magnetometers or accelerometers; position, proximity, and movement-related sensors such as piezoelectric materials, rangefinders, odometers, speedometers, shock detectors; imaging and other optical sensors such as charge-coupled devices (CCD), CMOS sensors, infrared sensors, and photodetectors; pressure sensors such as barometers, piezometers, and tactile sensors; force sensors such as piezoelectric sensors and strain gauges; temperature and heat sensors such as thermometers, calorimeters, thermistors, thermocouples, and pyrometers; proximity and presence sensors such as motion detectors, triangulation sensors, radars, photo cells, sonars, and hall-effect sensors; biochips; biometric sensors such as blood pressure sensors, pulse/ox sensors, blood glucose sensors, and heart monitors. Additionally, sensors may be formed with smart materials, such as piezo-electric polymers, which in some embodiments function as both a sensor and an actuator.

The various embodiments may include a single sensor or may include two or more sensors of the same or different types. Additionally, various embodiments may include different types of sensors.

Actuator drive circuit 254 is a circuit that receives a haptic signal (which is also referred to herein as a control signal) from actuator drive module 278. In some embodiments, actuator drive circuit 254 at least partially implements haptic drive circuit 106 as illustrated in FIG. 1. The haptic signal embodies haptic data associated with haptic effects, and the haptic data defines parameters that actuator drive circuit 254 uses to generate an actuator drive signal. In example embodiments, such parameters relate to, or are associated with, electrical characteristics. Examples of electrical characteristics that may be defined by the haptic data includes frequency, amplitude, phase, inversion, duration, waveform, attack time, rise time, fade time, and lag or lead time relative to an event. The actuator drive signal is applied to actuator 256 to cause one or more haptic effects.

Actuator 256, which also is referred to herein as a haptic actuator or a haptic output device, operates to generate haptic effects. In some embodiments, actuator 256 at least partially implements the haptic actuator 108 as illustrated in FIG. 1. Actuator 256 is controlled by processor 242 that executes actuator drive module 278, which sends a haptic signal to actuator drive circuit 254. Actuator drive circuit 254 then generates and applies an actuator drive signal to actuator 256 to drive actuator 256. When applied to actuator 256, an actuator drive signal causes actuator 256 to one or more generate haptic effects by activating and braking actuator 256.

Actuator 256 may be of various types. In the illustrated embodiments, the actuator is a resonant actuator, such as a Linear Resonant Actuator (LRA) in which a mass attached to a spring is driven back and forth. In other embodiments, the actuator is a solenoid resonant actuator (SRA).

Other types of electromagnetic actuators are also used, such as an Eccentric Rotating Mass (ERM) in which an eccentric mass is moved by a motor or a "smart material" such as piezoelectric, electro-active polymers or shape memory alloys. Actuators 256 also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

Apparatus 200 may include more than one actuator 256, and each actuator may include a separate actuator drive circuit 254, all coupled to processor 242. In embodiments with more than one actuator, each actuator may have a different output capability in order to create a wide range of haptic effects on the device.

Database 258 operates to store various data from the haptic signal conversion module 274 and/or the haptic effect rendering module 276.

In some embodiments, database 258 is configured as a secondary storage device (such as a hard disk drive, flash memory cards, digital video disks, compact disc read only memories, digital versatile disk read-only memories, random access memories, or read only memories) for storing digital data. The secondary storage device is connected to bus 240. The secondary storage devices and their associated computer readable media provide nonvolatile storage of computer readable instructions (including application programs and program modules), data structures, and other data for apparatus 200. Although it is illustrated that the secondary storage device for database 258 is included in apparatus 200, it is understood that the secondary storage device may be a separate device from apparatus 200 in other embodiments. In yet other embodiments, database 258 is included in memory 246.

Referring still to FIG. 3, memory 246 is configured to store a number of program modules for execution by processor 242, including a user input acquisition module 272, a haptic signal conversion module 274, a haptic effect rendering module 276, an actuator drive module 278, and a communication module 280. Each module is a collection of data, routines, objects, calls, and other instructions that perform one or more particular task. Although certain modules are disclosed herein, the various instructions and tasks described herein may be performed by a single module, different combinations of modules, modules other than those disclosed herein, or modules executed by remote devices that are in communication, either wirelessly or by wire, with apparatus 200.

User input acquisition module 272 are instructions that, when executed by the processor 242, cause the processor 242 to receive user inputs of one or more parameters associated with haptic effects or haptic effect modifiers. User input acquisition module 272 may communicate with input device 262 of user interface 250 and enable a user to input such parameters through input device 262. By way of example, user input acquisition module 272 provides a graphical user interface on a display screen (i.e., the input device 262) that enables a user to enter or select one or more parameters for haptic effects.

Haptic signal conversion module 274 includes instructions that, when executed by processor 242, cause the processor 242 to perform various functions of the haptic signal conversion system 100 herein.

Haptic effect rendering module 276 includes instructions that, when executed by the processor 242, cause processor 242 to render haptic effects on the haptic enabled apparatus 200. In at least some embodiments, haptic effect rendering module 276 generates a haptic data or haptic effect rendering model, which defines haptic data parameters that actuator drive circuit 254 uses to generate an actuator drive signal. In example embodiments, such haptic data parameters relate to, or are associated with, characteristics of the haptic drive signals, such as frequency, amplitude, phase, inversion, duration, waveform, attack time, rise time, fade time, and lag or lead time relative to an event. The actuator drive signal is applied to the actuator 256 to cause one or more haptic effects.

Actuator drive module 278 includes instructions that, when executed by processor 242, cause processor 242 to generate control signals for actuator drive circuit 254. Actuator drive module 278 also may determine feedback from actuator 256 and adjust the control signals accordingly. For example, the actuator drive module 278 may receive position or velocity information from the moving mass of an actuator (e.g., an LRA) and the feedback may be adjusted accordingly. In this example, the velocity of the moving mass may be increased or decreased to achieve a desired speed or the desired haptic effect.

Communication module 280 facilitates communication between apparatus 200 and remote devices. Examples of remote devices include computing devices, sensors, actuators, networking equipment such as routers and hotspots, vehicles, exercise equipment, and smart appliances. Examples of computing devices include servers, desktop computers, laptop computers, tablets, smartphones, home automation computers and controllers, and any other device that is programmable. The communication may take any form suitable for data communication including communication over wireless or wired signal or data paths. In various embodiments, the communication module may configure apparatus 200 as a centralized controller of the system or other remote devices, as a peer that communicates with other computing devices or other remote devices, or as a hybrid centralized controller and peer such that the controller may operate as a centralized controller in some circumstances and as a peer in other circumstances.

Alternative embodiments of the program modules are possible. For example, some alternative embodiments might have more or fewer program modules than the modules illustrated in FIG. 3. In some possible embodiments, one or more of the program modules are in remote devices such as remote computing devices or other wearable articles.

In some embodiments, the haptic signal conversion system 100 as illustrated in FIG. 1 may include one or more of the elements, devices, and components of the haptic enabled apparatus 200, as described with reference to FIG. 3. For example, the haptic signal conversion system 100 may include the processor 242, the memory 246 including at least one of the modules 272, 274, 276, 278, and 280, the monitoring device 252, the actuator drive circuit 254, and the actuator 256. In other examples, the haptic signal conversion system 100 may include more or less elements, devices, and components than illustrated in FIG. 3.

In other embodiments, the haptic signal conversion system 100 may be configured separately from the haptic enabled apparatus 200. For example, the haptic signal conversion system 100 is configured as part of a server computing device that communicates with the haptic enabled apparatus 200 via a network.

Figure 4:
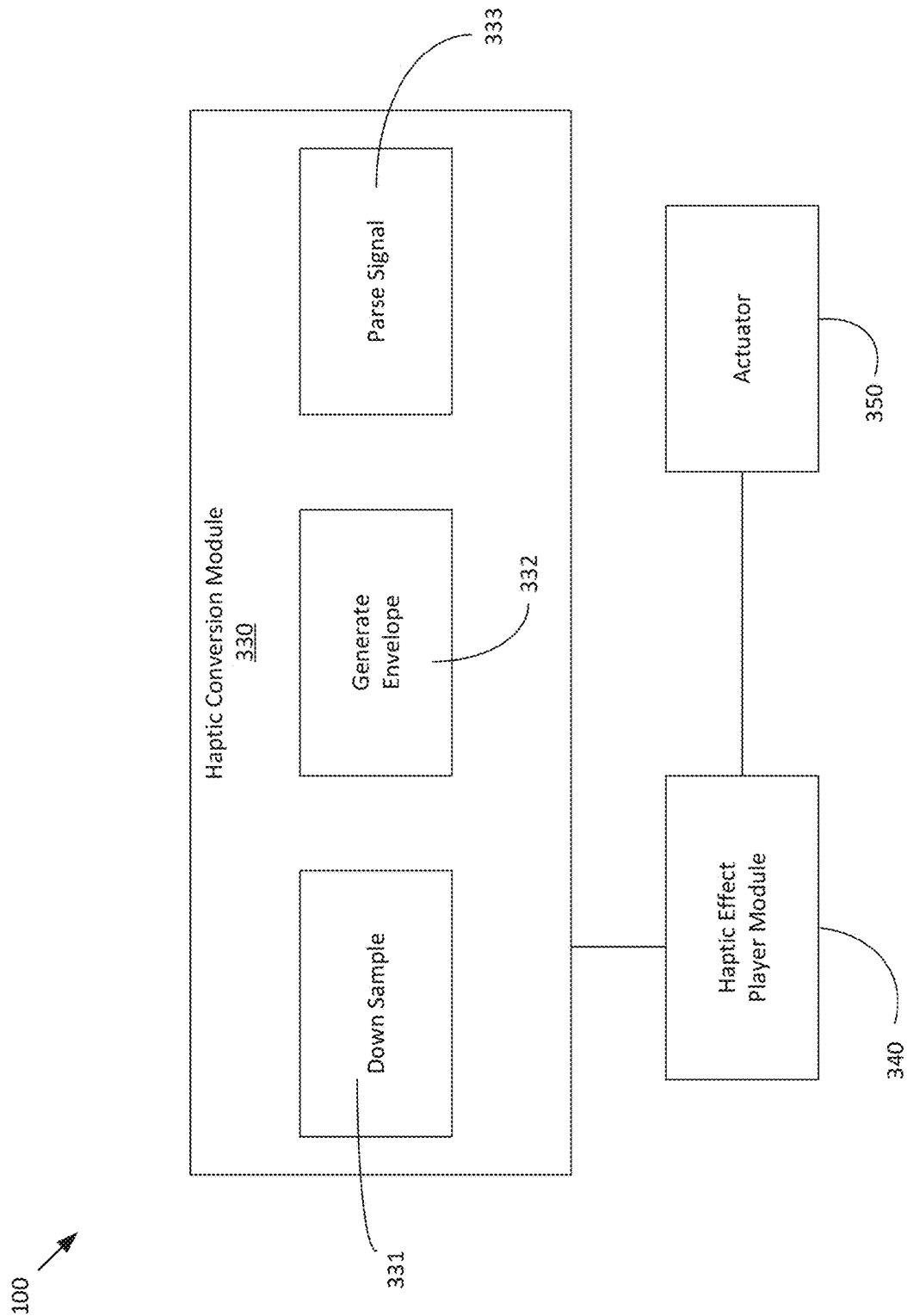
FIG. 4 illustrates an architecture diagram of a haptic signal conversion system according to an example embodiment of the present disclosure.

FIG. 4 illustrates an architecture diagram of a haptic signal conversion system 100 according to an example embodiment of the present disclosure.

Haptic signal conversion system 100 includes a haptic conversion module 330. In some embodiments, the haptic conversion module 330 at least partially implements, or is implemented by, haptic signal conversion module 274 as illustrated in FIG. 3. In the illustrated example embodiment, haptic conversion module 330 includes a down sampling module 331, an envelope generating module 332, and a parsing module 333. In alternate embodiments, the haptic conversion module 330 may include other sub-modules, or haptic conversion module 330 may be a single module.

In some embodiments, haptic signal conversion system 100 also includes a haptic effect player module 340 and an actuator 350. Haptic effect player module 340 may at least partially implement, or be implemented by, haptic effect rendering module 276, actuator drive module 278, and/or actuator drive circuit 254 as illustrated in FIG. 3. In some embodiments, haptic effect player module 340 is a module that is embedded within a device (e.g., a mobile device), and that is configured to play one or more haptic effects at an actuator by sending one or more haptic signals to the actuator. Examples of haptic effect player module 340 include a TouchSense® Player module by Immersion Corporation, an Oculus® Touch, and an HTC Vive® controller.

Actuator 350 is an actuator configured to receive one or more haptic signals, and configured to output one or more haptic effects. In some embodiments, actuator 350 at least partially implements, or is implemented by, actuator 256 and/or the actuator drive circuit 254 as illustrated in FIG. 3. In certain embodiments, actuator 350 is an actuator configured to receive a waveform, where the waveform is used to control a magnitude and precision of a waveform effect when played through the actuator. Actuator 350 may be, for example, a piezoelectric actuator, a high bandwidth actuator, or an EAP actuator.

According to the embodiment, down sampling module 331 is configured to down sample a signal (i.e., a result of lowering the sample rate of the signal). The term down sampling may refer to any type of device, system, and/or algorithm that transforms at least one information-bearing carrier signal to at least one lower-frequency signal, such as a baseband signal. Down sampling may refer to any type of demodulation method. A down converter may include an envelope detector, a sampler, an under sampler, a filter (e.g., a matched filter, a low-pass filter, and/or an anti-aliasing filter), a mixer, or any other type of device, system or algorithm that extracts an information signal from at least one carrier signal. A down sampler may include one or more signal-processing devices and/or algorithms including integrators, decision systems, feedback systems, decoders, correlators, delay, systems, equalizers, filters, microprocessors, timers, local oscillators, pulse shapers, and rectifiers.

In alternative embodiments, the signal may be up sampled. Up sampling may refer to any type of demodulation method. An up converter may include an envelope detector, a sampler, an under sampler, a filter (e.g., a matched filter, a low-pass filter, and/or an anti-aliasing filter), a mixer, or any other type of device, system or algorithm that extracts an information signal from at least one carrier signal. An up sampler may include one or more signal-processing devices and/or algorithms including integrators, decision systems, feedback systems, decoders, correlators, delay, systems, equalizers, filters, microprocessors, timers, local oscillators, pulse shapers, and rectifiers.

In certain alternate embodiments, if the following frames have the same frequency content then: the magnitude of the unprocessed frame may be played; or the magnitude of the processed frame may be played; or a constant vibration, perhaps small, may be played as long as the frame has the same frequency content; or the magnitude may be varied based on power content in the frequency band. In certain alternate embodiments, a different haptic effect may be played when a frame with different frequency content is found.

Furthermore, human perception of sounds as well as the tactile perception of vibration and/or kinesthetic force feedback are not linear and may depend on frequency. Perception of audio and haptic effects occurs at different scales of magnitude, and there are perceptive differences. For example, a change in directional force is more noticeable than a constant unchanging force. In addition, humans are more sensitive to low frequencies than to high frequencies. Gender and age also affect the perception. Thus, in certain embodiments, there may be a compensation factor that boosts (e.g., certain frequencies during conversion of a haptic signal. The boosting factor may be based on human perception or even preference of users where some frequency bands are enhanced manually. In some configurations, a haptic signal may be frequency-shifted to avoid the audible range (or to make it less audible). Here, frequencies may be filtered rather boosted to preserve the haptic content while reducing audible noise. The software may enhance, in general, the high frequency content where it is known that users have a lower sensitivity to sound. This enables the haptic effect for a specific band to be of greater strength, and thus, enhances the sound that, while perceived and noticed by a user's auditory system, might not have enough power. In another example, using a sound that may be detected algorithmically, but would be very hard for a human to perceive, a haptic effect is generated to accentuate that sound to render the event more noticeable without changing the audio itself.

According to certain embodiments, an envelope of the audio signal is generated by envelope generating module 332. An envelope may be extracted using all frequencies of an original audio signal or a filtered version of the original audio signal. However, the envelope itself does not have the same frequency content as the original audio signal.

Data parsing module 333 functions to parse the data transferred from the interface into a plurality of data segments. In an embodiment, the haptic conversion module 330 receives a signal that is too long to be passed to actuator 350. The signal is then parsed or divided into smaller signal segment by parsing module 333. Details regarding how the signal is parsed are described in greater detail below.

Figure 5:
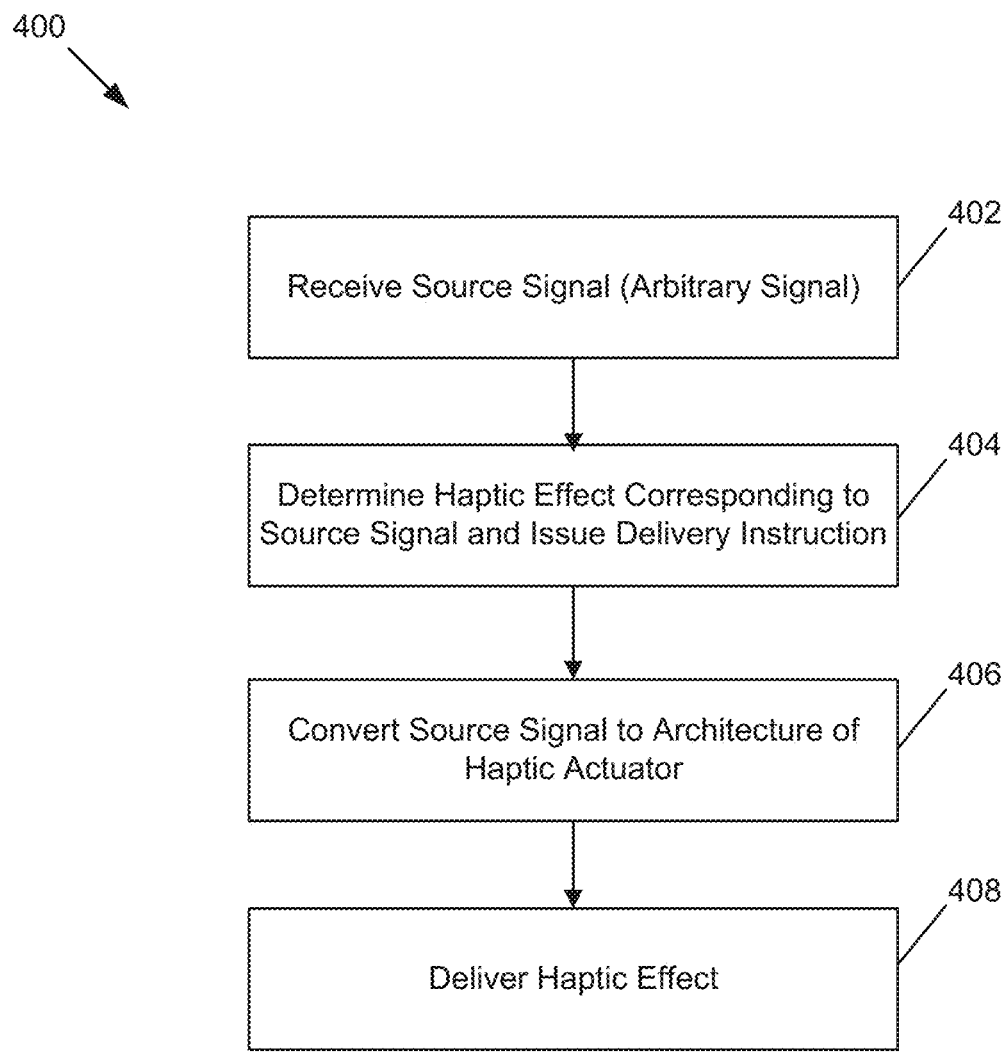
FIG. 5 is a flowchart of a method for generating a haptic effect according to an example embodiment of the present disclosure.

FIG. 5 is a flowchart that illustrates a method 400 for generating a haptic effect according to an example embodiment of the present disclosure. In some embodiments, method 400 is performed at least partially by haptic signal conversion system 100. Method 400 may be utilized with any of the various embodiments or combination of embodiments described herein.

Method 400 begins at operation 402 in which haptic signal conversion system 100 receives a source signal 102, such as an arbitrary signal. For example, the arbitrary signal may include a desired haptic waveform generated by a designer. At operation 404, haptic signal conversion system 100 operates to determine a haptic effect that corresponds to source signal 102 and issues an instruction to deliver the haptic effect. In some embodiments, the haptic effect may be stored in memory and retrieved for the determination. At operation 406, haptic signal conversion system 100 operates to convert source signal 102 (with the haptic effect) to the architecture of a haptic device. At operation 408, haptic signal conversion system 100 operates to deliver the haptic effect by actuating the haptic device.

Figure 6:
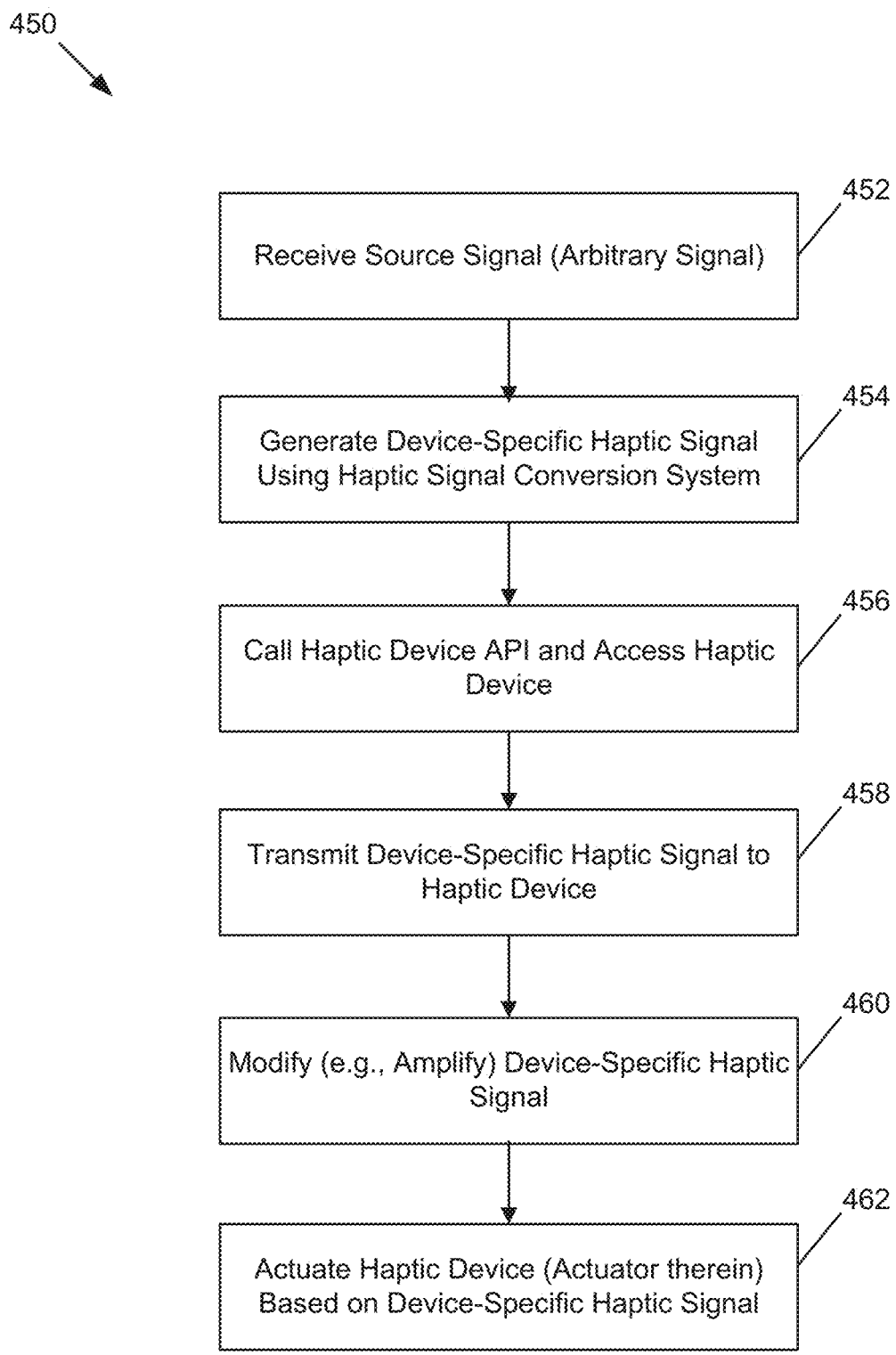
FIG. 6 is a flowchart of another method for generating a haptic effect according to an example embodiment of the present disclosure.

FIG. 6 is a flowchart that illustrates another method 450 for generating a haptic effect from a source signal 102 according to an example embodiment of the present disclosure. In some embodiments, the method 450 is performed at least partially by haptic signal conversion system 100 (FIG. 1). In other embodiments, method 450 is performed at least partially by the processor system 110 (FIG. 2), interface device 180 (FIG. 2), and/or the haptic enabled apparatus 200 (FIG. 3), which may at least partially implement haptic signal conversion system 100. Method 450 may be utilized with any of the various embodiments or combination of embodiments described herein.

At operation 452, method 450 is performed to receive a source signal 102 (e.g., an arbitrary signal). In some embodiments, haptic signal conversion system 100 receives the source signal 102. At operation 454, method 450 uses haptic signal conversion system 100 to generate a device-specific haptic signal 104 (as shown in FIG. 1). Example methods for performing operation 454 using the haptic signal conversion system 100 are described in more detail herein, for example with reference to FIGS. 7-14.

In some embodiments, device-specific haptic signal 104 includes a number of discrete values per a predetermined period of time. By way of example, where an application program interface (API) of a haptic device that generates a haptic effect based on source signal 102 has an array of magnitudes from 0 to 255 that have 3.125 millisecond spacing with a maximum buffer of 255 bytes long, device-specific haptic signal 104 is configured to send 6 values every 18.75 milliseconds. Other configurations of device-specific haptic signal 104 are also possible. In other embodiments, device-specific haptic signal 104 includes an analog signal.

At operation 456, method 450 is performed to call the API of the haptic device to access the haptic device to generate a haptic effect based on device-specific haptic signal 104. In some embodiments, the values of device-specific haptic signal 104 may be buffered. At operation 458, method 450 is performed to transmit device-specific haptic signal 104 to the haptic device. In the above example, device-specific haptic signal 104 is transmitted to the haptic device with a pulse train, such as 1 millisecond unidirectional pulse train at 3.125 milliseconds with a pulse height equal to the buffer value. For example, the signal may be non-linear 0 to 2.7 volts.

At operation 460, device-specific haptic signal 104 may be modified in various configurations. In some embodiments, device-specific haptic signal 104 may be amplified. For example, device-specific haptic signal 104 may be modified with a low-pass filter. At operation 462, method 450 is performed to actuate the haptic device (e.g., an actuator therein) to generate a haptic effect based on the device-specific haptic signal 104. Example methods for actuating an actuator are described herein, for example with reference to FIGS. 1-4. By way of example, where the actuator includes a resonant actuator, such as a Linear Resonant Actuator (LRA), the actuator of the haptic device may be operated with acceleration from two modes, such as with 160 Hz and 320 Hz.

Figure 7:
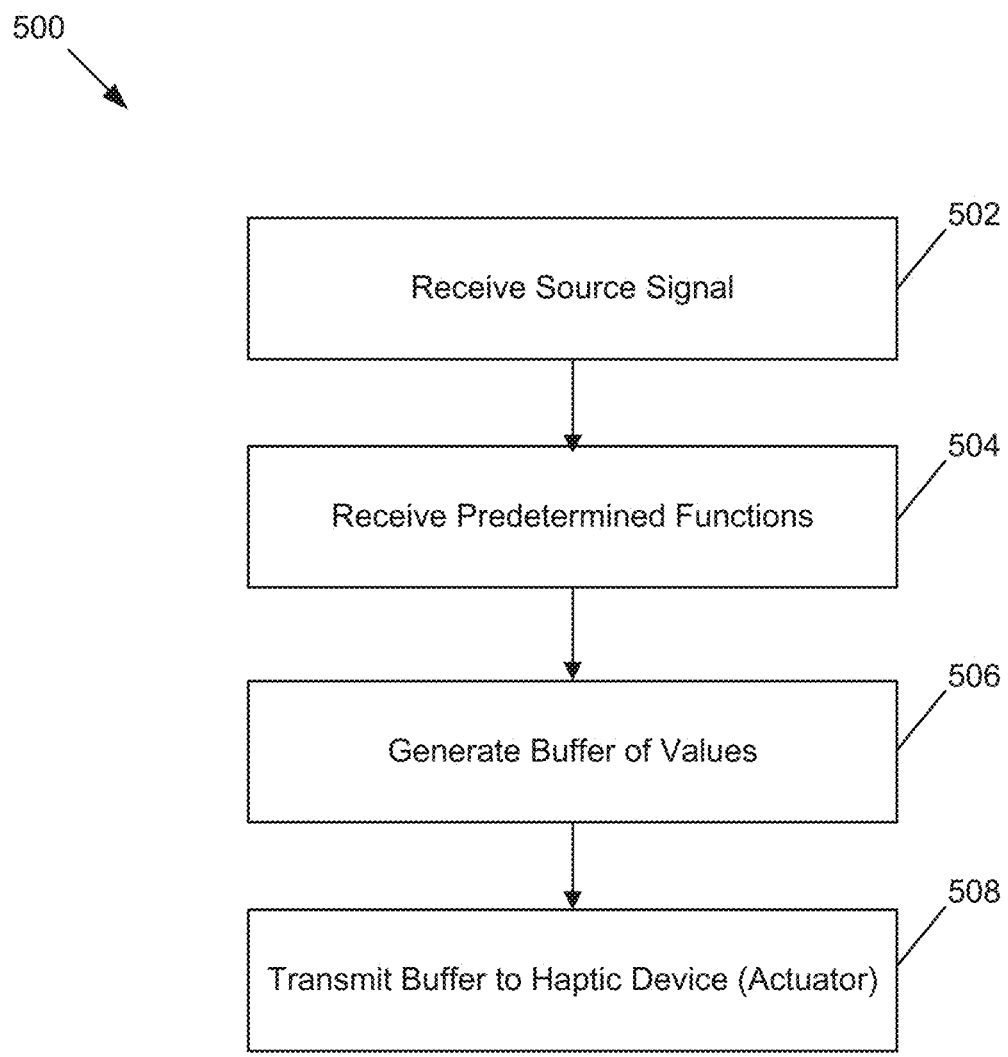
FIG. 7 is a flowchart of a method for operating the haptic signal conversion system according to an example embodiment of the present disclosure.

FIG. 7 is a flowchart that illustrates a method 500 for operating the haptic signal conversion system 100 according to an example embodiment of the present disclosure. In some embodiments, method 500 is used to at least partially implement operation 454 of FIG. 6. In this example, haptic signal conversion system 100 generates a buffer of signal values that may represent device-specific haptic signal 104.

At operation 502, haptic signal conversion system 100 operates to receive source signal 102 (e.g., the arbitrary signal), which is to be rendered in a haptic device (e.g., the interface device 180 or haptic enabled apparatus 200). At operation 504, haptic signal conversion system 100 operates to receive or retrieve one or more predetermined functions. In some embodiments, the predetermined functions may be stored in memory in the haptic signal conversion system 100 and/or one or more other computing devices. These functions include electrical characteristics that may be placed in timelines, animations, or other similar locations. One example of the functions includes a periodic function with respect to, for example, magnitude, frequency, attack time, decay time, and/or arbitrary envelope with control points. Another example of the functions includes a mixed periodic function, such as a combination of different frequencies.

At operation 506, haptic signal conversion system 100 operates to generate a buffer of signal values based on source signal 102. The buffer of signal values may be included, or represented by, the device-specific haptic signal 104 as illustrated in FIG. 1. The buffer of signal values may be determined by analyzing and mapping source signal 102. In some embodiments, the buffer of signal values includes a predetermined number of values for a predetermined subsequent period of time. In the above example, the buffer of signal values includes 6 values that are to be subsequently used to generate a haptic effect for a next predetermined amount of time. Other numbers of values are also possible, such as a range from 2 to 12 samples. The number of values in each buffer may be dependent on the capabilities of the haptic device (e.g., the actuator therein). Example methods for generating the buffer of signal values from the source signal 102 are described in more detail herein, for example with reference to FIGS. 8 and 9. In other embodiments, the basic functions also may be used to generate the buffer of signal values.

At operation 508, haptic signal conversion system 100 operates to transmit the buffer of values (e.g., the device-specific haptic signal 104) to the corresponding haptic device so that the haptic device renders a haptic effect based on the buffer of values. For example, the buffer of values is used to generate an actuator drive signal that is then applied to the actuator of the haptic device to cause the designed haptic effect.

Figure 8:
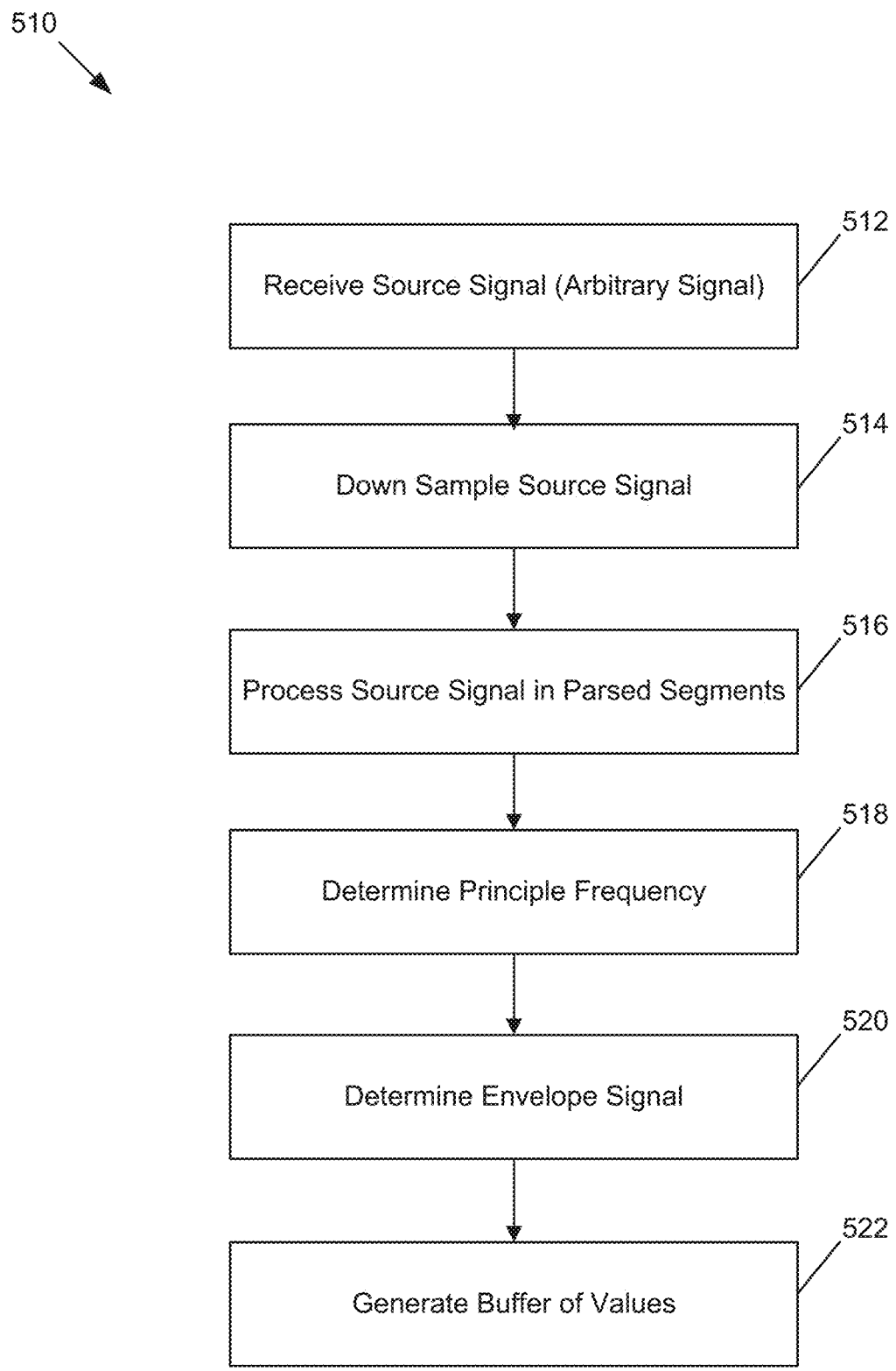
FIG. 8 is a flowchart of a method for converting a source signal to a specific architecture of a haptic device according to an example embodiment of the present disclosure.

FIG. 8 is a flowchart of a method 510 for converting a source signal 102 to a specific architecture of a haptic device according to an example embodiment of the present disclosure. In some embodiments, method 510 generates the buffer of signal values as described in FIG. 7. Method 510 is configured to generate the buffer of signal values (e.g., device-specific haptic signal 104) at least partially from the source signal 102 by matching the frequency of source signal 102 to the frequency of the haptic actuator 108 (FIG. 1).

At operation 512, haptic signal conversion system 100 receives a source signal 102 (e.g., an arbitrary signal). At operation 514, the haptic signal conversion system 100 operates to down sample source signal 102. Various methods may be used for down sampling source signal 102. For example, maximum values may be used for down sampling. In other examples, average values may be used for down sampling.

At operation 516, haptic signal conversion system 100 operates to process the down-sampled source signal 102 in parsed segments. In some embodiments, the segments of the signal may be predetermined in size. For example, the sizes of segments are identically preset so that the signal is parsed into segments in the predetermined size. In other embodiments, the sizes of segments are automatically determined. An example of parsing the signal is illustrated and described in more details herein, for example with reference to FIG. 11.

At operation 518, haptic signal conversion system 100 operates to determine a principal frequency (e.g., frequency with highest or other peak magnitude) of source signal 102. At operation 520, haptic signal conversion system 100 operates to determine an envelope signal from source signal 102.

At operation 522, haptic signal conversion system 100 operates to generate a buffer of values. In some embodiments, the buffer of values may be generated at the principal frequency with a magnitude according to the envelope of a selected segment. If the segment is long, the segment may be divided into sub-segments, and each of the sub-segments may be analyzed similarly. The buffer of values may be created differently in other embodiments.

Figure 9:
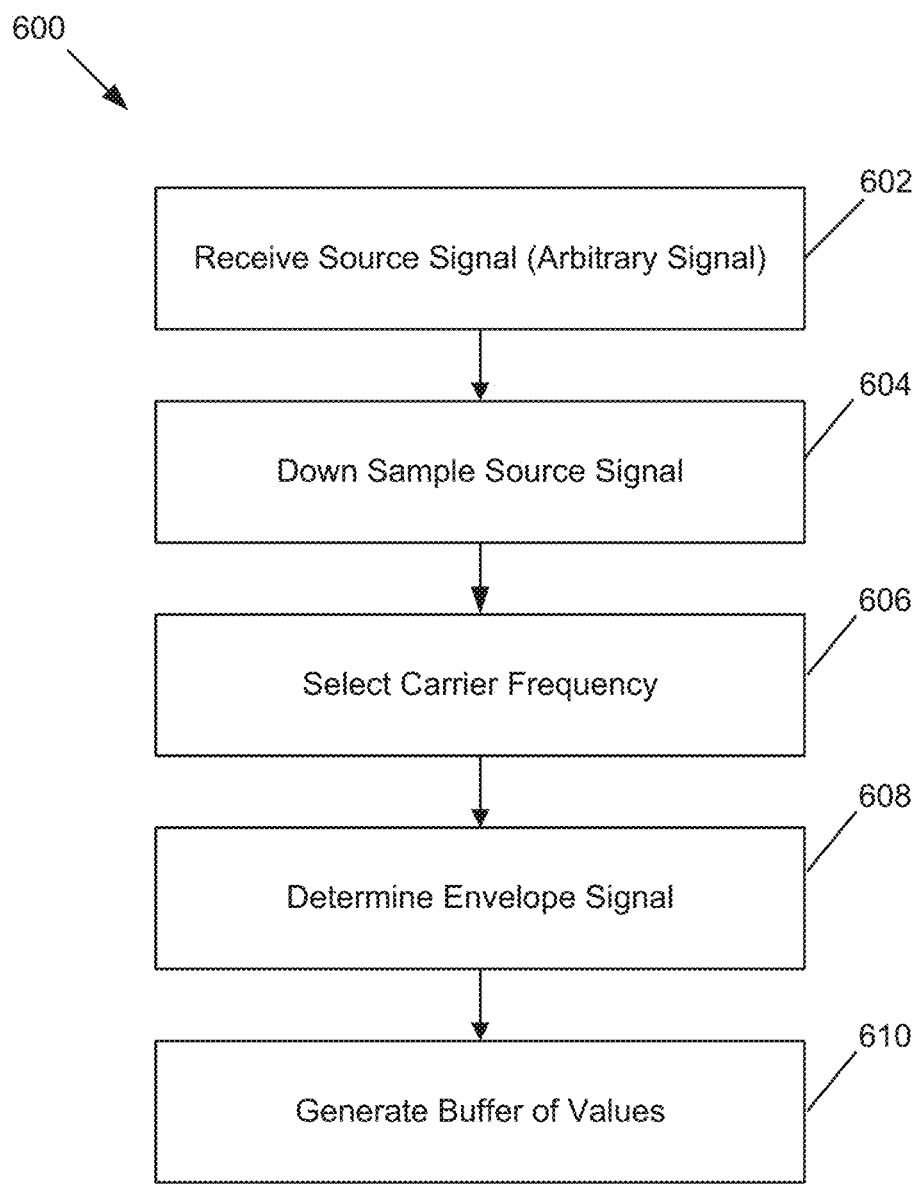
FIG. 9 is a flowchart of another method for converting a source signal to a specific architecture of a haptic device according to an example embodiment of the present disclosure.

FIG. 9 is a flowchart of another method 600 for converting a source signal 102 to a specific architecture of a haptic device according to an example embodiment of the present disclosure. In some embodiments, method 600 is may be used to generate the buffer of signal values as described in FIG. 7. Method 600 is configured to generate the buffer of signal values (e.g., the device-specific haptic signal 104) at least partially from the source signal 102 and transmit the buffer with a carrier signal with a fixed frequency. In some embodiments, method 600 includes choosing a carrier frequency, which is dependent on the capabilities of the haptic actuator.

At operation 602, haptic signal conversion system 100 receives a source signal 102 (e.g., an arbitrary signal). At operation 604, haptic signal conversion system 100 operates to down sample the source signal 102. Various methods may be used for down sampling source signal 102. For example, maximum values may be used for down sampling. In other examples, average values may be used for down sampling.

At operation 606, haptic signal conversion system 100 operates to select a carrier frequency (e.g., pulse train frequency) for a carrier signal that is to be modulated with the down sampled source signal 102. Various frequencies may be used for the carrier frequency. In some embodiments, two different frequencies, such as 160 Hz and 320 Hz, are used, and one of them is selected for the carrier frequency based on one or more criteria. For example, the carrier frequency is selected based on a frequency limit of the haptic actuator that is to create a haptic effect based on source signal 102. An example of selecting the carrier frequency is described in more detail herein, for example with reference to FIG. 10.

At operation 608, haptic signal conversion system 100 operates to determine an envelope signal from source signal 102. At operation 610, haptic signal conversion system 100 operates to generate a buffer of values. In some embodiments, the buffer of values is generated to have a magnitude according to the envelope signal. For example, the magnitude is mapped to the pulse width for each time step. In some embodiments, the magnitude is configured to not exceed half of the carrier frequency. The buffer of values is transmitted with the carrier frequency. In some embodiments, the buffer of values always maintains the carrier frequency.

Figure 10:
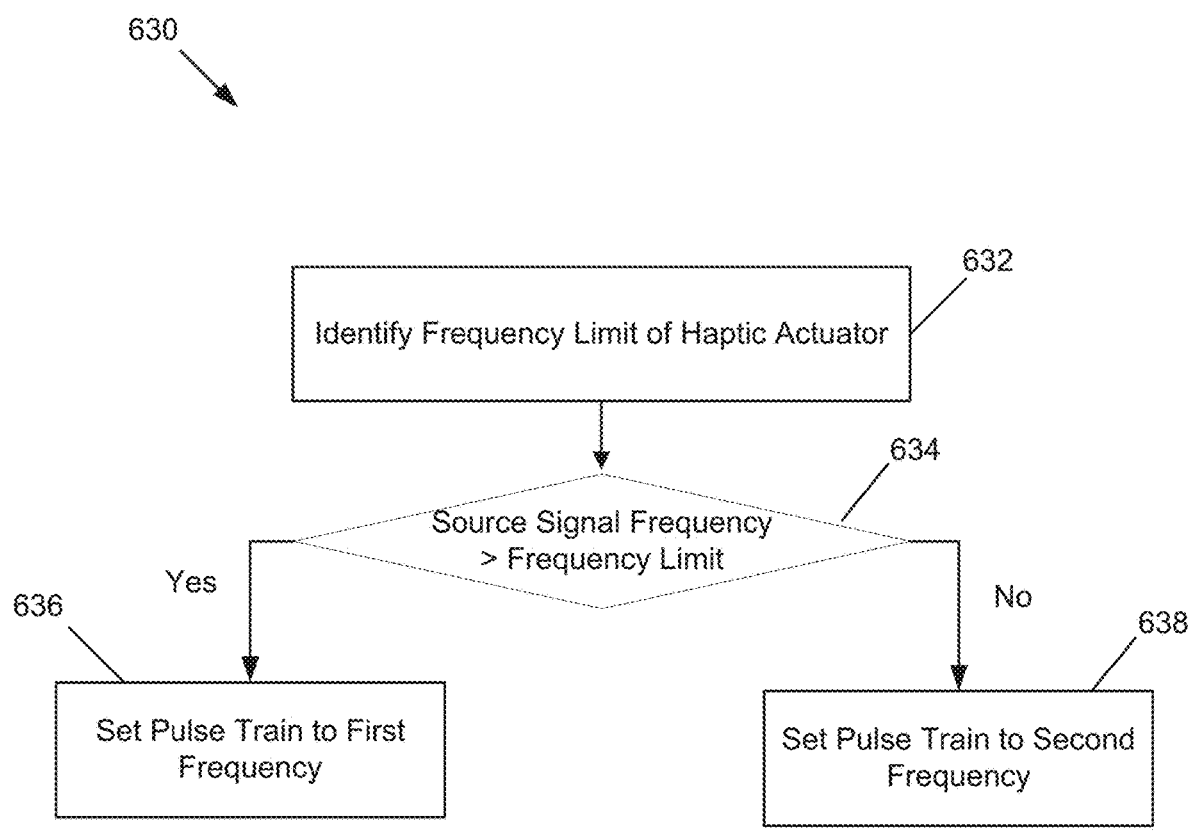
FIG. 10 is a flowchart of a method of selecting a carrier frequency of FIG. 9 according to an example embodiment of the present disclosure.

FIG. 10 is a flowchart of a method 630 of selecting a carrier frequency of FIG. 9 according to an example embodiment of the present disclosure. In this example, method 630 is used to choose the carrier frequency based on the capabilities of the haptic actuator. Various types of signals can be used for the carrier signal. In some embodiments, a pulse train is used for the carrier signal. Other waveforms may be used for the carrier signal in other embodiments.

At operation 632, haptic signal conversion system 100 operates to identify a frequency limit of haptic actuator 108 that is configured to generate a haptic effect. At operation 634, haptic signal conversion system 100 operates to determine whether the frequency of source signal 102 (or the down-sampled signal thereof) is greater than the frequency limit of the haptic actuator 108. If the frequency of source signal 102 (or the down-sampled signal thereof) is greater than the frequency limit of haptic actuator 108 ("Yes" in this operation), method 630 moves on to operation 636 in which a carrier frequency (e.g., a pulse train) is set to a first frequency. Otherwise ("No" in this operation), method 630 continues to operation 638 in which the carrier frequency (e.g., a pulse train) is set to a second frequency. By way of example, the first frequency and the second frequency are selected from 160 Hz and 320 Hz. Depending on the frequency limit of the haptic actuator, the pulse train is set to either 160 Hz or 320 Hz. Other carrier frequencies are also envisioned, depending on the capabilities of the haptic actuator.

In some applications, one haptic output device (e.g., an actuator) may resonate at precise frequencies as specified by a designer or programmer (e.g., a carrier frequency that is modulated), which may be referred to as an HD actuator. Another device (e.g., a non-HD or SD actuator) may be configured to execute a series of pulses (i.e., a pulse train). The rate of pulsing gives the user the perception of frequency.

A design tool may expose a periodic pulsing separate from the perceived frequency of the effect. A way to fix this is to fill the pulses with either high frequency pitch data or with a high frequency pulse train to simulate pitch. An algorithm, combined with device characterization data, is configured to determine whether to use high-frequency fill or to simulate the pitch with pulse-trains.

Most devices are configured to achieve specific discrete frequencies. This may depend on hardware capabilities, firmware, and/or software. The design tool in accordance to example embodiments of the present disclosure exposes the attainable frequencies to the designer.

Figure 11:
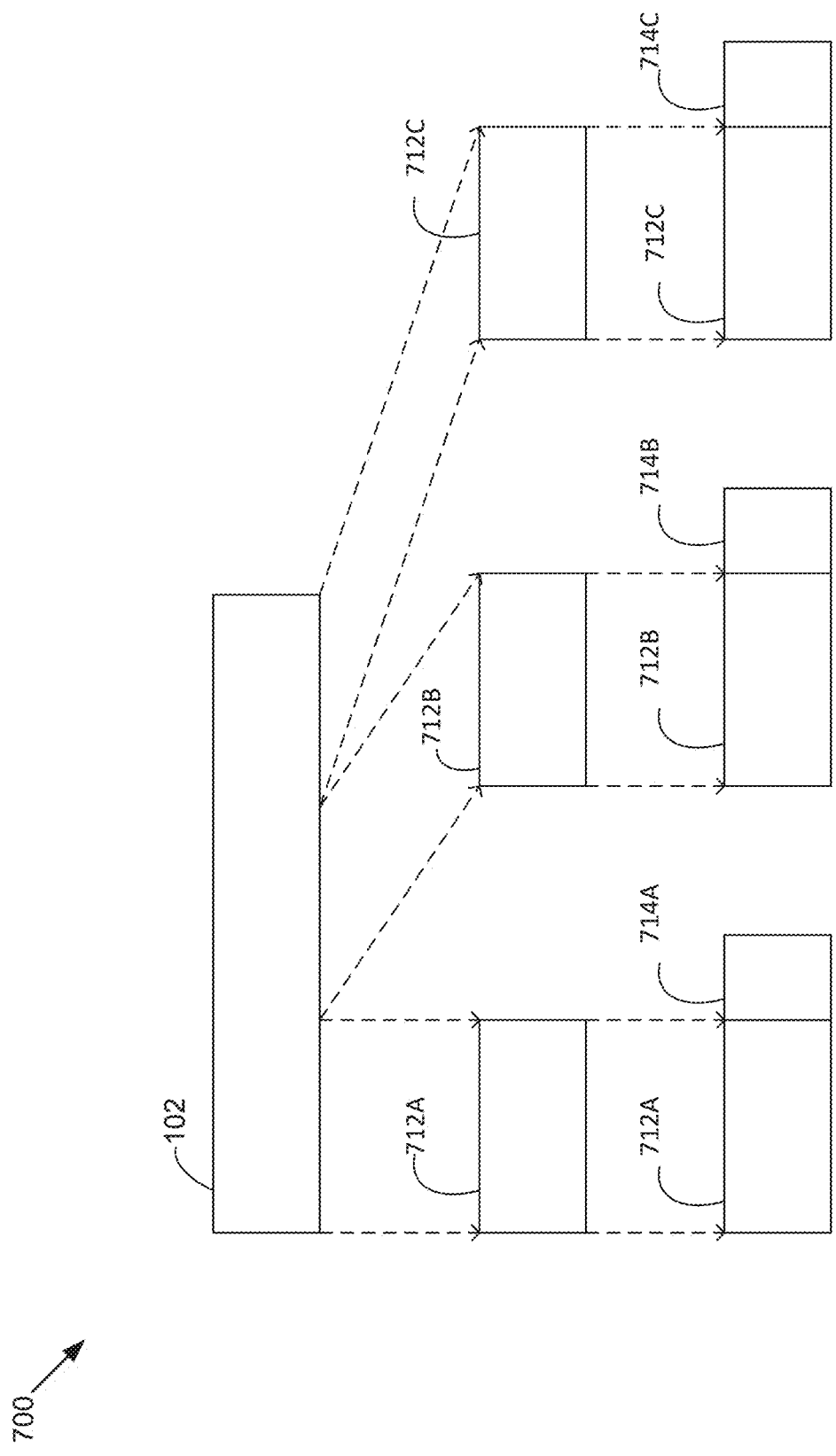
FIG. 11 illustrates a method of parsing the source signal according to an example embodiment of the present disclosure.

FIG. 11 illustrates a method 700 of parsing or dividing the source signal 102 according to an example embodiment of the present disclosure. In some embodiments, haptic signal conversion system 100 operates to divide source signal 102 into a plurality of segments 712 (including 712A, 712B, and 712C). In some embodiments, blank signals 714 (including 714A, 714B, and 714C) (also referred to as dummy data) are inserted between the segments 712 to generate a signal with a desired frequency. The haptic signal conversion system 100 may continue to collect signal segments with or without blank signals inserted until a fixed buffer size is generated.

Figure 12:
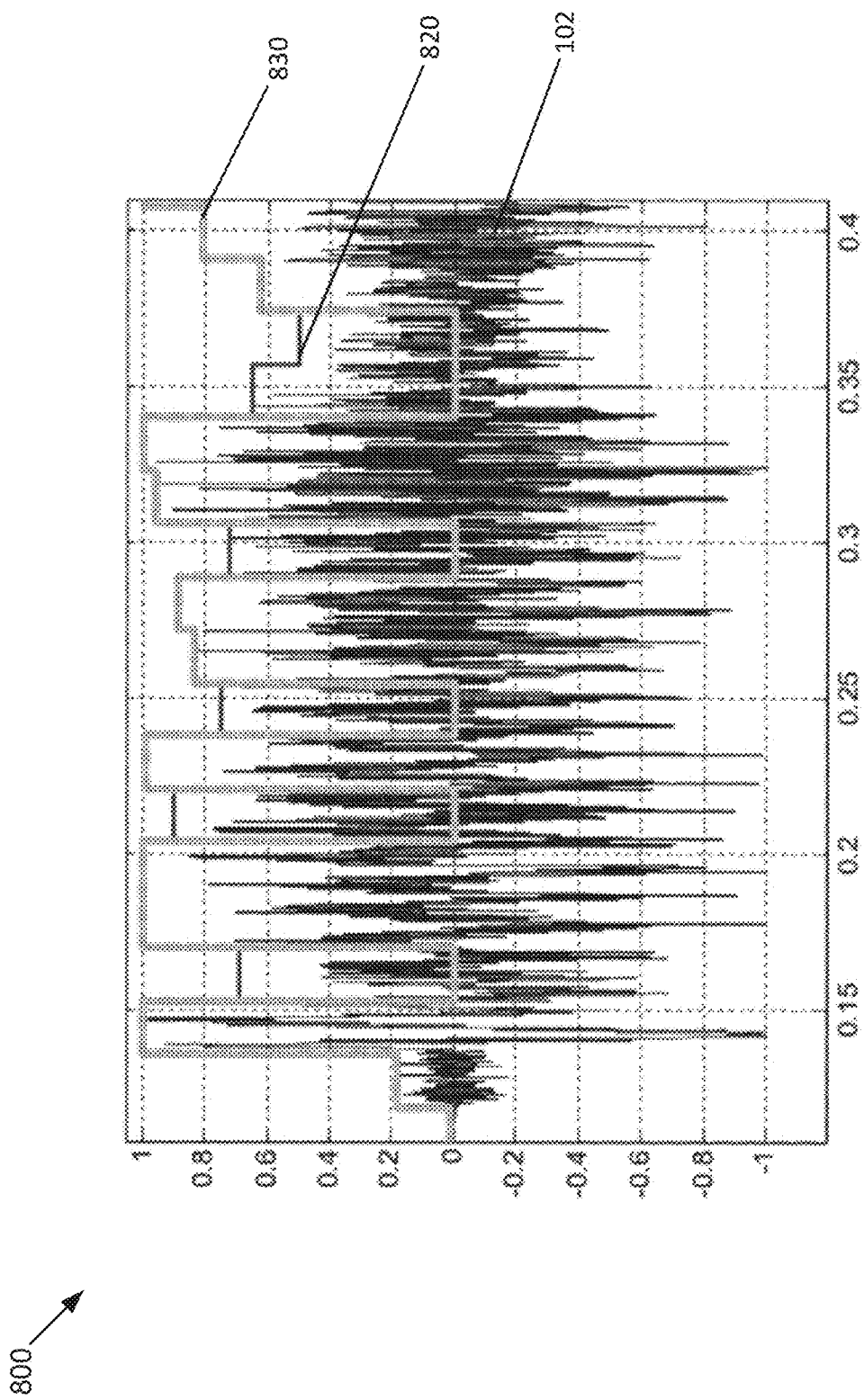
FIG. 12 illustrates a computation of a magnitude of a haptic effect created based on a digital signal according to an example embodiment of the present disclosure.

FIG. 12 illustrates a computation 800 of a magnitude of a haptic effect that is created based on a digital signal according to an example embodiment of the present disclosure. In FIG. 12, a source signal 810 is sampled at 44.1 kHz, a maximum value 820 is computed for a 20 ms frame length, and pulses 830 are obtained by magnitude filtering. According to the embodiment, the pulses 830 capture an envelope of the source signal 102 and thus, pulses 830 are configured to convey this information to a user through one or more haptic effects.

Figure 13:
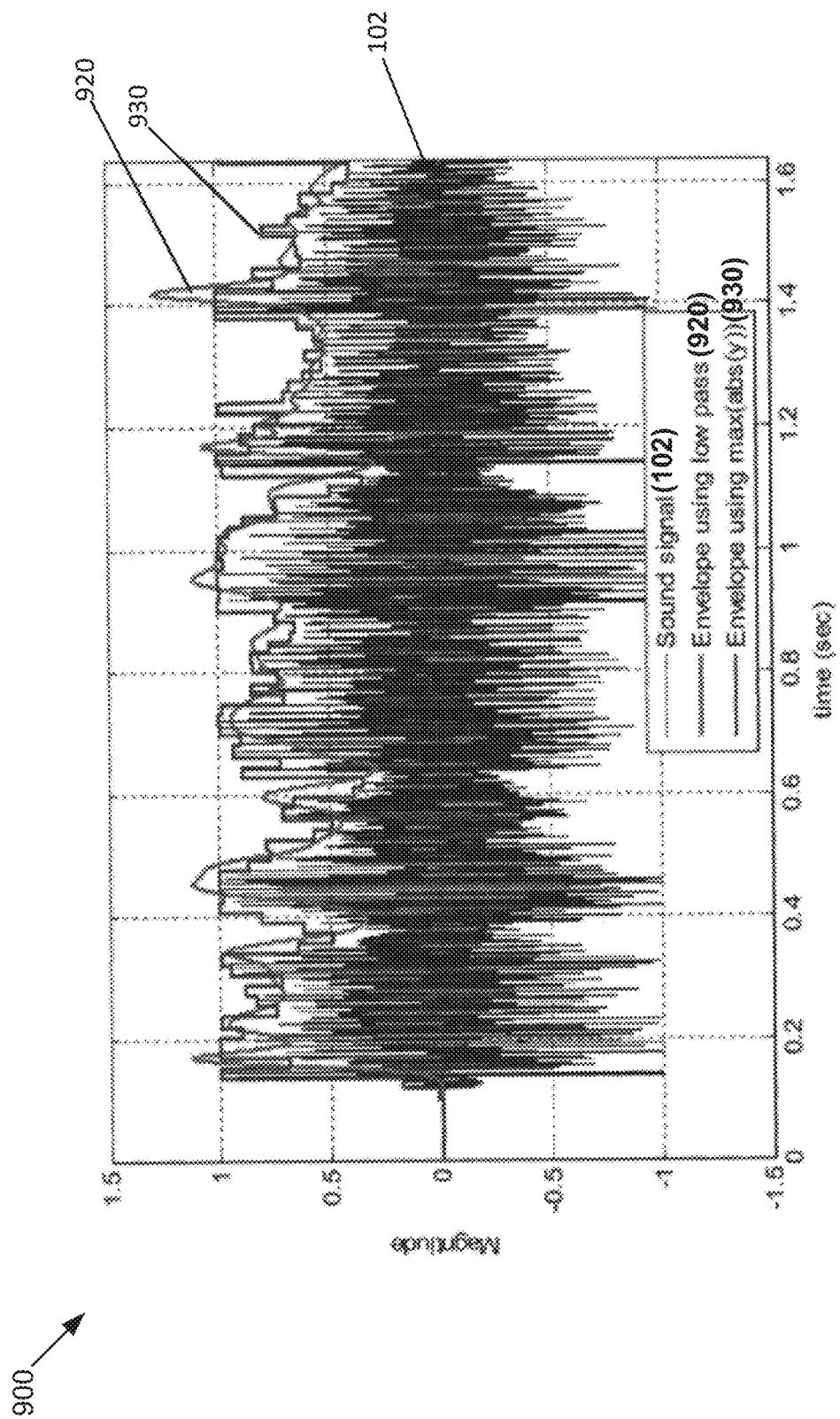
FIG. 13 illustrates a calculation of an envelope of a source signal according to an example embodiment of the present disclosure.

FIG. 13 illustrates a calculation 900 of an envelope of a source signal according to an example embodiment of the present disclosure. In FIG. 13, a source signal 102 is an audio signal. An envelope 920 of source signal 102 may be obtained by low-pass filtering the absolute value of the source signal 102. Another envelope 930 may be obtained by computing the maximum of the absolute value over a certain frame, in this case of 20 ms.

Each frame of certain duration (e.g., millisecond duration) is processed in the frequency domain. Thus, in certain embodiments, a fast Fourier transformation (FFT) of the frame may be used to extract the frequency content. In other embodiments, band-pass filters may be used to extract the frequency content.

Figure 14:
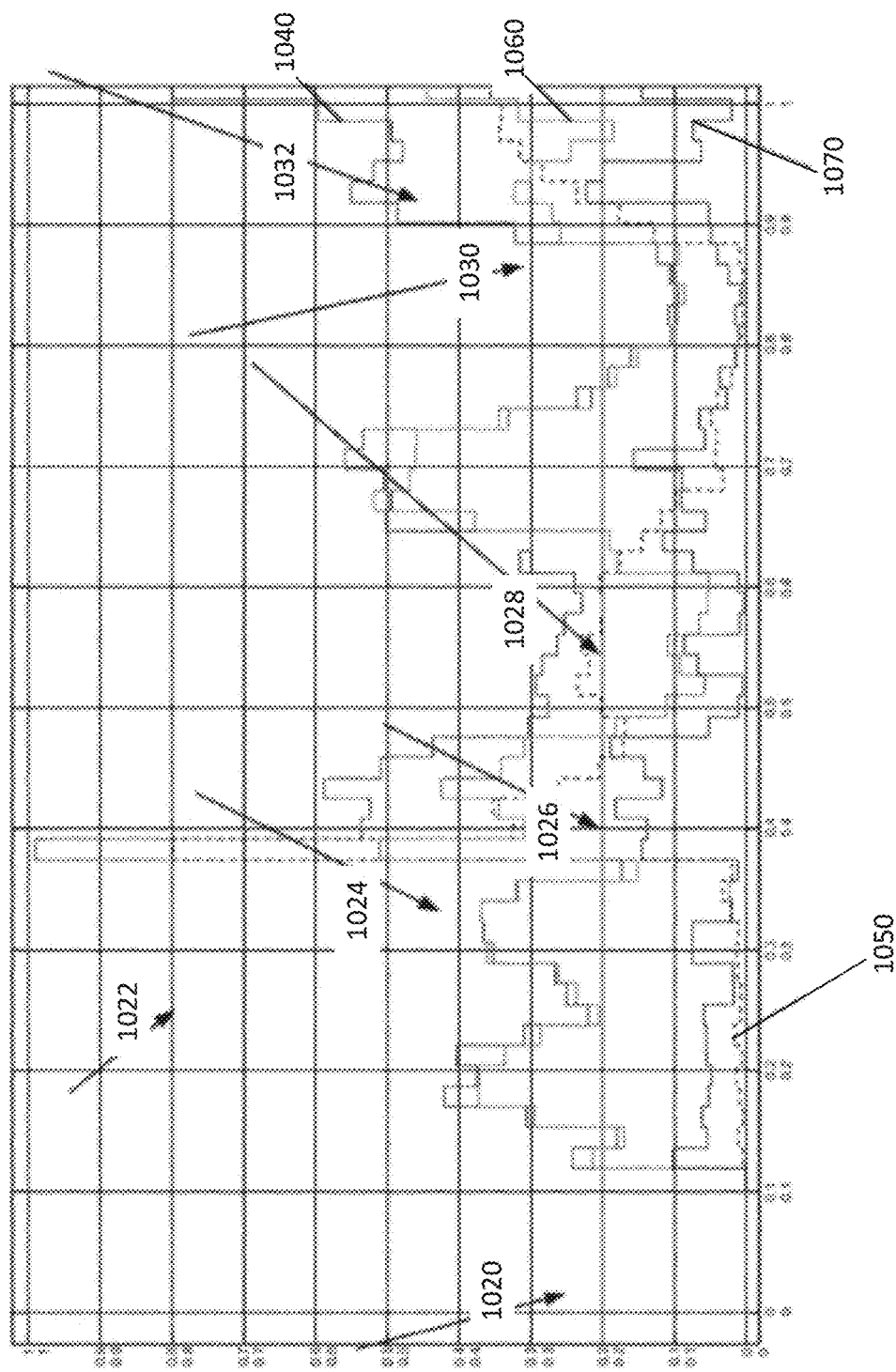
FIG. 14 illustrates a calculation of an envelope of a source signal based on frequency content according to an example embodiment of the present disclosure.

FIG. 14 illustrates a calculation 1000 of an envelope of a source signal based on frequency content according to an example embodiment of the present disclosure. According to the embodiment, a maximum value is obtained once a signal data frame (e.g., an audio data frame) is processed as previously described. In effect, three maximum values are obtained, one for low frequency bands, one for middle frequency bands, and one for high frequency bands.

As illustrated in FIG. 14, a graph 1040 represents an unprocessed maximum value, which may be based on the entire source signal 102. A graph 1050 represents a maximum value that corresponds to a low frequency range of source signal 102. A graph 1060 represents a maximum value that corresponds to a medium frequency range of source signal 102. A graph 1070 represents a maximum value that corresponds to a high frequency range of source signal 102.

According to the embodiment, when the signal starts to be processed, the first frame contains more middle frequency content (e.g., graph 1060), given the maximum value obtained which is bigger than a frequency value in the low frequency band (e.g., graph 1050) and high frequency band (e.g., graph 1070).

According to the embodiment, a haptic effect can be played when the content frequency of the frame is different from the frequency content of the previous frame. As illustrated in FIG. 14, the haptic effect is played at the locations signalized by arrows 1020, 1022, 1024, 1026, 1028, 1030, 1032. For example, if the a frame and a subsequent frame have the same frequency content, then the magnitude of the unprocessed frame may be played; or the magnitude of the processed frame may be played; or a constant vibration, perhaps small, may be played as long as the frame has the same frequency content; or the magnitude may be varied based on power content in the frequency band. Alternatively, if a frame and a subsequent frame have different frequency content, a different haptic effect may be played.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A virtual reality system comprising
a haptic output device comprising a fixed signal frequency,
a processor coupled to the haptic output device, wherein the processor is configured to:
receive a signal from an external source having a signal frequency,
process the signal into parsed segments, wherein the parsed segments correspond to a period of the signal to create an output signal,
compress the signal frequency to substantially match a fixed frequency of the haptic output device,
determine a magnitude of an envelope of the parsed segments,
adjust the magnitude of the parsed segments to match the magnitude of the envelope to create an adjusted parsed segment,
buffer the adjusted parsed segments, and
generate a haptic signal based on the adjusted parsed segment and send the haptic signal to the haptic output device.

2. The system of claim 1, wherein the parsed segments correspond to a speed of the haptic output device.

3. The system of claim 1, wherein the signal frequency is a principal frequency.

4. The system of claim 1, wherein the frequency is a principal frequency and the buffer is generated at the principal frequency with a magnitude according to an envelope signal of the parsed segment of the signal.

5. The system of claim 1, wherein the buffer comprises a magnitude that is set at an envelope signal and maintains a carrier frequency.

6. An apparatus for generating a haptic effect, the apparatus comprising:
an actuator;
an actuator drive circuit configured to operate the actuator; and
a processing device connected to the actuator drive circuit, the processing device configured to:
select a carrier frequency;
receive a signal from an external source, the signal being unconfigured for the actuator;
process the signal to create a signal buffer;
determine an envelope of the signal;
generate a haptic signal compatible with the actuator based on the signal buffer; and
transmit the haptic signal to the actuator drive circuit, the haptic signal enabling the actuator drive circuit to control the actuator, thereby providing a haptic effect,
wherein the selecting a carrier frequency comprises:
identifying a frequency limit of the actuator;
determining whether a frequency of the signal is greater than the frequency limit; and
selecting a carrier frequency based on the determination,
and wherein the signal buffer is generated to have a magnitude according to the envelope of the signal and transmitted with the carrier frequency.

7. The apparatus of claim 6, wherein the processing device is further configured to up sample the source haptic signal.

8. The apparatus of claim 6, wherein the processing device is further configured to frequency-shift the haptic output signal to render it less perceptible.

9. A method for generating a haptic effect using a haptic output device, the method comprising:
receiving a source haptic signal from an external source, the source haptic signal being unconfigured for the haptic output device;
processing the source haptic signal into parsed segments;
generating a buffer of signal values for at least one of the parsed segments;
determining an envelope of the source haptic signal, the buffer of signal values being generated with a magnitude according to the envelope of the at least one of the parsed segments;
generating a haptic signal compatible with the haptic output device based on the buffer of signal values; and
applying the haptic output signal to the haptic output device, thereby providing the haptic effect.

10. The method of claim 9, further comprising:
determining a principal frequency of the source haptic signal;
wherein the signal buffer is generated at the principal frequency with a magnitude according to the envelope of the at least one of the parsed segments.

11. The method of claim 9, further comprising:
selecting a carrier frequency;
wherein the signal buffer is transmitted with the carrier frequency.

12. The method of claim 11, wherein selecting a carrier frequency includes:
identifying a frequency limit of the haptic output device;
determining whether a frequency of the source haptic signal is greater than the frequency limit; and
selecting a carrier frequency based on the determination.

13. The method of claim 11, wherein the carrier frequency is selected from 160 Hz and 320 Hz.

14. The method of claim 9, further comprising:
down sampling the source haptic signal.

15. The method of claim 9, wherein the source haptic signal includes at least one of an audio signal, a video signal, an acceleration signal, or other signals captured by one or more sensors.

16. The method of claim 9, comprising up sampling the source haptic signal.

17. The method of claim 9, comprising frequency-shifting the haptic output signal to render it less perceptible.

* * * * *